(12) United States Patent
Jin et al.

(10) Patent No.: US 12,207,065 B2
(45) Date of Patent: Jan. 21, 2025

(54) POWER SUPPLY DEVICE AND METHOD FOR SEARCHING AUDIO OUTPUT DEVICE USING POWER SUPPLY DEVICE

(71) Applicant: SAMSUNG ELECTRONICS CO., LTD., Suwon-si (KR)

(72) Inventors: Juyeon Jin, Suwon-si (KR); Gupil Cheong, Suwon-si (KR); Doosuk Kang, Suwon-si (KR); Bokun Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 214 days.

(21) Appl. No.: 18/045,767

(22) Filed: Oct. 11, 2022

(65) Prior Publication Data

US 2023/0066296 A1 Mar. 2, 2023

Related U.S. Application Data

(63) Continuation of application No. PCT/KR2021/019912, filed on Dec. 27, 2021.

(51) Int. Cl.
*H04R 3/12* (2006.01)
*H04W 48/16* (2009.01)

(52) U.S. Cl.
CPC ............. *H04R 3/12* (2013.01); *H04W 48/16* (2013.01); *H04R 2420/03* (2013.01); *H04R 2420/05* (2013.01); *H04R 2420/07* (2013.01)

(58) Field of Classification Search
CPC .. H04R 3/12; H04R 2420/03; H04R 2420/05; H04R 2420/07; H04R 29/008;
(Continued)

(56) References Cited

U.S. PATENT DOCUMENTS 9,769,558 B2 * 9/2017 Chandramohan .... H04B 1/3888
10,448,211 B1 * 10/2019 Shen .................. G06K 7/10366
(Continued)

FOREIGN PATENT DOCUMENTS

CN 104412614 A 3/2015
CN 105228043 A 1/2016
(Continued)

OTHER PUBLICATIONS

International Search Report and Written Opinion of the International Searching Authority dated Apr. 15, 2022, in connection with International Application No. PCT/KR2021/019912, 8 pages.
(Continued)

*Primary Examiner* — Akelaw Teshale

(57) ABSTRACT

An electronic device includes: a wireless communication circuit; a power management circuit; and a control circuit, and the control circuit may: in a state where the electronic device connects a first communication with a first audio output device by using the wireless communication circuit, or is electrically connected with the first audio output device by using the power management circuit, operate in a connection standby mode or in an advertise mode by using a first wireless communication address of the first audio output device; receive a signal for finding the first audio output device from an external electronic device, based on the first wireless communication address; and transmit a signal for letting the first audio output device output a notification to the first audio output device through the first communication, or transmit the signal to the first audio output device through the electrical connection.

12 Claims, 17 Drawing Sheets

(58) Field of Classification Search
CPC .................. H04R 2430/01; H04R 1/1025;
H04R 1/1016; H04R 1/1041; H04R 5/04;
H04W 48/16; H04W 4/80; Y02D 30/70;
G08B 7/06
See application file for complete search history.

(56) References Cited

U.S. PATENT DOCUMENTS

| | | | |
|---|---|---|---|
| 11,043,086 B1* | 6/2021 | Daoura | G08B 21/24 |
| 11,290,802 B1* | 3/2022 | Nandy | G10L 15/08 |
| 2013/0298208 A1* | 11/2013 | Ayed | G06F 21/43 |
| | | | 375/259 |
| 2013/0315902 A1 | 11/2013 | Travassos | |
| 2015/0078574 A1 | 3/2015 | Shin | |
| 2015/0373448 A1 | 12/2015 | Shaffer | |
| 2017/0048619 A1 | 2/2017 | Bang et al. | |
| 2017/0187828 A1* | 6/2017 | Soji | H04L 67/62 |
| 2017/0192743 A1* | 7/2017 | Chun | H04W 76/14 |
| 2017/0228566 A1* | 8/2017 | Sengstaken, Jr. | G06K 19/0717 |
| 2017/0238103 A1* | 8/2017 | Gehring | H04W 4/80 |
| | | | 381/23.1 |
| 2017/0303028 A1* | 10/2017 | Lalvani | H04R 1/025 |
| 2018/0091884 A1* | 3/2018 | Minoo | H04R 1/1016 |
| 2018/0091887 A1 | 3/2018 | Minoo et al. | |
| 2019/0045292 A1* | 2/2019 | Yung | H04R 1/1041 |
| 2019/0069066 A1 | 2/2019 | Song et al. | |
| 2019/0103899 A1* | 4/2019 | Lee | G06F 1/1605 |
| 2019/0110567 A1 | 4/2019 | Brzezinski et al. | |
| 2020/0105268 A1 | 4/2020 | Deng | |
| 2020/0110439 A1 | 4/2020 | Deng | |
| 2020/0252713 A1 | 8/2020 | Larsen | |
| 2020/0321792 A1 | 10/2020 | Rhee et al. | |
| 2022/0210611 A1* | 6/2022 | Moreno | H04W 4/80 |

FOREIGN PATENT DOCUMENTS

| | | |
|---|---|---|
| CN | 108174457 A | 6/2018 |
| CN | 108683998 A | 10/2018 |
| CN | 109413556 A | 3/2019 |
| CN | 109492441 A | 3/2019 |
| CN | 211352418 U | 8/2020 |
| EP | 3621068 A1 | 3/2020 |
| JP | 6019544 A | 12/2012 |
| KR | 10-2017-0019750 A | 2/2017 |
| KR | 10-1904281 B1 | 10/2018 |
| KR | 10-2019-0021033 A | 3/2019 |
| KR | 10-2020-0117461 A | 10/2020 |

OTHER PUBLICATIONS

Supplementary European Search Report dated Jun. 18, 2024, in connection with European Patent Application No. EP21915712.0, 9 pages.

* cited by examiner

POWER SUPPLY DEVICE AND METHOD FOR SEARCHING AUDIO OUTPUT DEVICE USING POWER SUPPLY DEVICE

CROSS-REFERENCE TO RELATED APPLICATIONS

This application is a bypass continuation of International Application PCT/KR2021/019912 filed on Dec. 27, 2021, which claims priority to Korean Patent Application No. 10-2020-0186522, filed on Dec. 29, 2020, the disclosures of which are herein incorporated by reference in their entirety.

BACKGROUND

1. Field

Various embodiments disclosed in the present document relate to an audio output device and a power supply device, and also, to a method for finding a position of an audio output device by using a power supply device in an external electronic device.

2. Description of Related Art

Thanks to the development of technology, various external electronic devices capable of outputting audio based on data received through wireless communication are developing. Since such an audio output device may exchange data with an external electronic device (for example, a smartphone, a tablet, a notebook, a personal computer (PC) or a portable external electronic device) by connecting Bluetooth communication of short-range wireless communication, it may be referred to as a Bluetooth earphone. Since the Bluetooth earphone provides activity and convenience to a user compared to an existing wired earphone, many users are increasingly using the Bluetooth earphones.

The Bluetooth earphone of the cord-free type from which a wire of the earphone is completely removed may include a separate battery therein, and a separate charging case may be provided to charge and store the battery.

SUMMARY

A Bluetooth earphone may connect Bluetooth communication with an external electronic device to perform various functions (for example, sound output) loaded therein when the Bluetooth earphone is worn on a user's body. The Bluetooth earphone may determine that it is not in use when the Bluetooth earphone is received in a power supply device (for example, a charging case or a charging accessory), and may disconnect the Bluetooth communication from the external electronic device.

As Bluetooth earphones are getting smaller, it may be difficult to find where a Bluetooth earphone is lost or placed, and a function of finding the position of a Bluetooth earphone may be provided through Bluetooth communication connection with an external electronic device. For example, when a Bluetooth earphone finding function is executed in an external electronic device, the external electronic device may request an alarm (for example, a notification sound, vibration, or LED lighting, etc.) from a Bluetooth earphone through Bluetooth communication.

However, when a user puts a Bluetooth earphone into a power supply device and loses it, the user may not use the function of finding the Bluetooth earphone in an external device since Bluetooth communication between the Bluetooth earphone and the external electronic device is disconnected and the power supply device is not able to wirelessly communicate with the external electronic device. In addition, when the Bluetooth earphone is not received in the power supply device but Bluetooth communication between the Bluetooth earphone and the external electronic device is disconnected, there is no way of finding the lost Bluetooth earphone in the external electronic device.

Various embodiments disclosed in the present document may provide an external electronic device and a power supply device which may find a position of a Bluetooth earphone by using the power supply device when Bluetooth communication between the Bluetooth earphone and the external electronic device is disconnected.

An electronic device according to an embodiment may include: a wireless communication circuit; a power management circuit; and a control circuit electrically connected with the wireless communication circuit and the power management circuit, and the control circuit may: in a state where the electronic device connects a first communication with a first audio output device by using the wireless communication circuit, or is electrically connected with the first audio output device by using the power management circuit, operate in a connection standby mode or in an advertise mode by using a first wireless communication address of the first audio output device; receive a signal for finding the first audio output device from an external electronic device, based on the first wireless communication address; and, in response to the signal for finding the first audio output device being received, transmit a signal for letting the first audio output device output a notification (or alarm) (or a signal indicating the first audio output device output a notification, a signal instructing the first audio output device to output a notification) to the first audio output device through the first communication, or transmit the signal to the first audio output device through the electrical connection.

According to an embodiment, a method for finding a position of an audio output device by using an electronic device may include: in a state where the electronic device connects a first communication with a first audio output device or is electrically connected with the first audio output device, operating in a connection standby mode or in an advertise mode by using a first wireless communication address of the first audio output device; receiving a signal for finding the first audio output device from an external electronic device, based on the first wireless communication address; and, in response to the signal for finding the first audio output device being received, transmitting a signal for letting the first audio output device output a notification (or an alarm) to the first audio output device through the first communication, or transmitting the signal to the first audio output device through the electrical connection.

According to an embodiment, an audio output device may include: an audio processing circuit; a power management circuit; a wireless communication circuit configured to establish a communication connection by using a wireless communication address; and a control circuit electrically connected with the audio processing circuit, the power management circuit, and the wireless communication circuit, and the control circuit may be configured to: establish a first communication connection with a power supply device by using the wireless communication circuit, or an electrical connection with the power supply device by using the power management circuit; receive, from the power supply device, a signal for finding at least one audio output device including the audio output device, the signal being received by the power supply device from an external electronic device; and, in response to the signal for finding the at least one audio output device being received, control the audio processing circuit to output a notification (or an alarm).

The power supply device according to various embodiments disclosed in the present document may operate in a connection standby mode or in an advertise mode by using a wireless communication address of the audio output device, so that, even when the external electronic device does not know the wireless communication address of the power supply device, the power supply device may receive a signal for finding the audio output device.

The audio output device according to various embodiments disclosed in the present document may output an alarm for informing its own position by receiving a signal for finding the audio output device, which is received by the power supply device from the external electronic device, from the power supply device.

In addition, other various effects that may be directly or indirectly grasped through the present document may be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Regarding explanation of the drawings, the same or similar reference numerals are used for the same or similar components.

DETAILED DESCRIPTION

Figure 1:
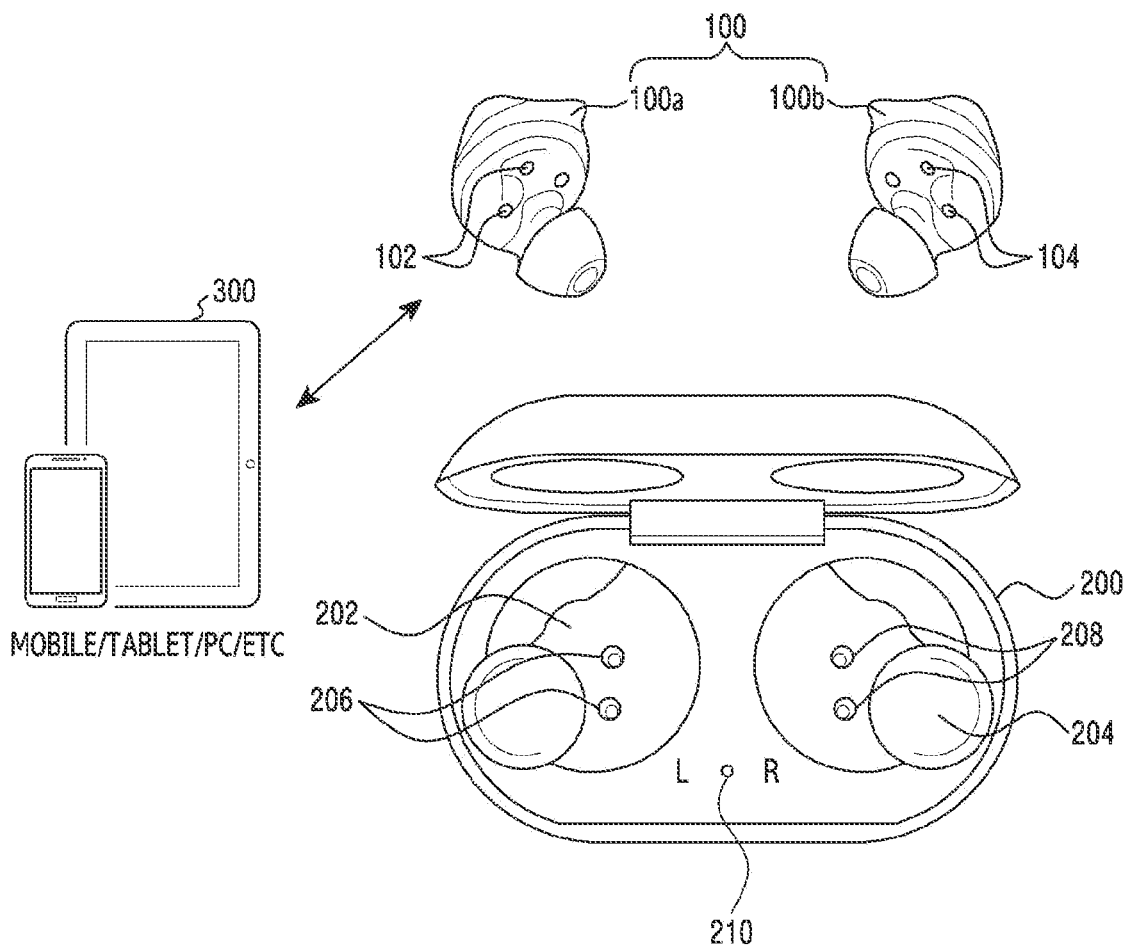
FIG. 1 illustrates a view of an audio output device, an electronic device capable of receiving the audio output device, and an external electronic device according to an embodiment.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments disclosed in the present document will be described with reference to the accompanying drawings. For convenience of explanation, components illustrated in the drawings may have their sizes exaggerated or reduced, and the present disclosure is not limited to illustrations.

FIG. 1 illustrates an audio output device 100, an electronic device 200 (or a case device, a power supply device, hereinafter, referred to as a "powersupply device") capable of receiving the audio output device 100, and an external electronic device 300.

According to an embodiment, the audio output device 100 may be received and stored in the power supply device 200 when the audio output device 100 is not in use. When the audio output device 100 is in use, the audio output device 100 may be worn on a part of a user's body (for example, ears). According to an embodiment, the audio output device 100 may be configured in pairs to be worn on both ears of a user. For example, the audio output device 100 may include a first audio output device 100a to be worn on the user's right ear, and a second audio output device 100b to be worn on the user's left ear.

Referring to FIG. 1, the power supply device 200 may include a first receiver 202 to have the first audio output device 100a disposed therein, and a second receiver 204 to have the second audio output device 100b disposed therein. In an embodiment, a first interface 206 including at least one terminal may be disposed on a bottom surface of the first receiver 202, and a second interface 208 including at least one terminal may be disposed on a bottom surface of the second receiver 204.

According to an embodiment, the first interface 206 and the second interface 208 may include a pogo pin. According to an embodiment, the first interface 206 and the second interface 208 may include at least one of a charging power terminal, a ground (GND) terminal, a detect terminal, or a data communication terminal. At least one terminal of the first interface 206 and the second interface 208 may be disposed to physically or electrically come into contact with at least one terminal of the audio output device 100 when the audio output device 100 is received in the power supply device 200.

According to an embodiment, at least one terminal of the first interface 206 and the second interface 208 may perform at least one function of functions of the charging power terminal, the detect terminal, and the data communication terminal. For example, one terminal included in the first interface 206 may detect that the first audio output device 100a is disposed in the first receiver 202, may charge the first audio output device 100a, and/or may perform data communication with the first audio output device 100a. In another example, one terminal included in the second interface 208 may detect that the second audio output device 100b is disposed in the second receiver 204, may charge the second audio output device 100b, and/or may perform data communication with the second audio output device 100b.

In an embodiment, the power supply device 200 may include at least one light emitting diode (LED) display lamp 210. In an embodiment, the LED display lamp 210 may output a signal when the first audio output device 100a or the second audio output device 100b is disposed in at least one receiver of the first receiver 202 or the second receiver 204. For example, when the first audio output device 100a is disposed in the first receiver 202, the LED display lamp 210 may output a signal (for example, green light or red light) indicating a charging state (for example, a fully charged state or an intermediate charged state) of the first audio output device 100a. In another example, when the first audio output device 100a is disposed in the first receiver 202 or the second audio output device 100b is disposed in the second receiver 204, the power supply device 200 may also output a vibration signal indicating a charging state (for example, an initial charging state or a fully charged state) of the first audio output device 100a and/or the second audio output device 100b.

In an embodiment, the first audio output device 100a may receive power from the power supply device 200 through a first interface 102. In an embodiment, the second audio output device 100b may receive power from the power supply device 200 through a second interface 104. In an embodiment, the first audio output device 100a may transmit data to the power supply device 200 through the first interface 102, and the second audio output device 100b may transmit data to the power supply device 200 through the second interface 104. For example, the first audio output device 100a may transmit information including battery remaining capacity information of the first audio output device 100a to the power supply device 200.

In an embodiment, the first audio output device 100a may exchange data with the power supply device 200 through the first interface 102, and the second audio output device 100b may exchange data with the power supply device 200 through the second interface 104. For example, the first audio output device 100a may receive, from the power supply device 200, information including battery remaining capacity information of the second audio output device 100b and/or battery remaining capacity information of the power supply device 200. The second audio output device 100b may receive, from the power supply device 200, information including battery remaining capacity information of the first audio output device 100a and/or battery remaining capacity information of the power supply device 200. In another example, the first audio output device 100a and/or the second audio output device 100b may exchange information including each other's battery remaining capacity information by using communication connected between the first audio output device 100a, and the second audio output device 100b.

According to an embodiment, the audio output device 100 may output audio when the audio output device is worn on a user's body. According to an embodiment, at least one of the first audio output device 100a and the second audio output device 100b may output audio by exchanging wireless data with the external electronic device 300. For example, a path for exchanging the wireless data may include at least one of a path for a Bluetooth communication scheme, a path for a Bluetooth low energy (BLE) communication scheme, a path for a wireless fidelity (Wi-Fi) direct communication scheme, and a path for a mobile communication scheme (for example, cellular communication, sidelink). For example, when the Bluetooth communication scheme or BLE communication scheme is used, the audio output device 100 and the external electronic device 300 may identify each other's wireless communication address, and may perform communication.

According to an embodiment, only one of the pair of audio output devices 100a, 100b may generate the communication path with the external electronic device 300. For example, the external electronic device 300 may be connected with the first audio output device 100a out of the pair of audio output devices 100a, 100b. When the external electronic device 300 is connected with the first audio output device 100a, the external electronic device 300 or the first audio output device 100a may provide information on the communication path to the second audio output device 100b in order for the second audio output device 100b to output the audio. The second audio output device 100b may receive or sniff data which is transmitted to the first audio output device 100a, based on the information on the communication path, and may output the audio. According to an embodiment, the first audio output device 100a connected with the external electronic device 300 may be referred to as a master device or a main audio output device, and the second audio output device 100b that is not connected with the external electronic device 300 may be referred to as a slave device or a sub audio output device.

According to an embodiment, the first audio output device 100a and/or the second audio output device 100b may use a true wireless stereo (TWS) (for example, a relay method, a sniffing method), TWS+, or audio over BLE (AoBLE) communication method with the external electronic device 300. When the TWS communication method is used, the first audio output device 100a and the second audio output device 100b may connect communication therebetween, and may collect information, and any one of the first audio output device 100a and the second audio output device 100b may connect communication with the external electronic device 300 and may transmit the collected information. When the TWS+ or AoBLE communication method is used, the first audio output device 100a and the second audio output device 100b may connect communication with the external electronic device 300, respectively, and may transmit information.

According to an embodiment, when the first audio output device 100a and/or the second audio output device 100b is communicatively coupled with the external electronic device 300, the external electronic device 300 may be a master device, and the first audio output device 100a and/or the second audio output device 100b may be a slave device. According to another embodiment, when communication is connected between the first audio output device 100a and the second audio output device 100b, one of the first audio output device 100a and/or the second audio output device 100b may be a master device, and the other one may be a slave device. According to an embodiment, when communication is connected between the first audio output device 100a and the second audio output device 100b, the roles (or settings) of the master device and the slave device of the first audio output device 100a and the second audio output device 100b may be changed based on a designated condition. For example, when the first audio output device 100a and the second audio output device 100b are removed from the power supply device 200 simultaneously, the first audio output device 100a that may be worn on the right may correspond to a master device, and the second audio output device 100b that may be worn on the left may correspond to a slave device. In another example, when only the second audio output device 100b is removed from the power supply device 200, the second audio output device 100b may correspond to a master device. However, this should not be considered as limiting, and the roles of the master device and the slave device of the first audio output device 100a and the second audio output device 100b may be fixed. For example, the roles of the master device and the slave device of the first audio output device 100a and the second audio output device 100b may be designated by a designer, or may not be changeable after being fixed.

According to an embodiment, a device that corresponds to a master device among the audio output devices 100 may perform a role of transmitting data generated at the audio output device 100 to the external electronic device 300. For example, the master device may perform a role of transmitting a response signal to data transmitted from the external electronic device 300 to the audio output device 100, transmitting data (for example, audio data acquired through a microphone or a sensor value acquired through a sensor) generated at the audio output device 100, and/or transmitting state information (for example, a remaining capacity of a battery) of the audio output device 100.

Figure 2:
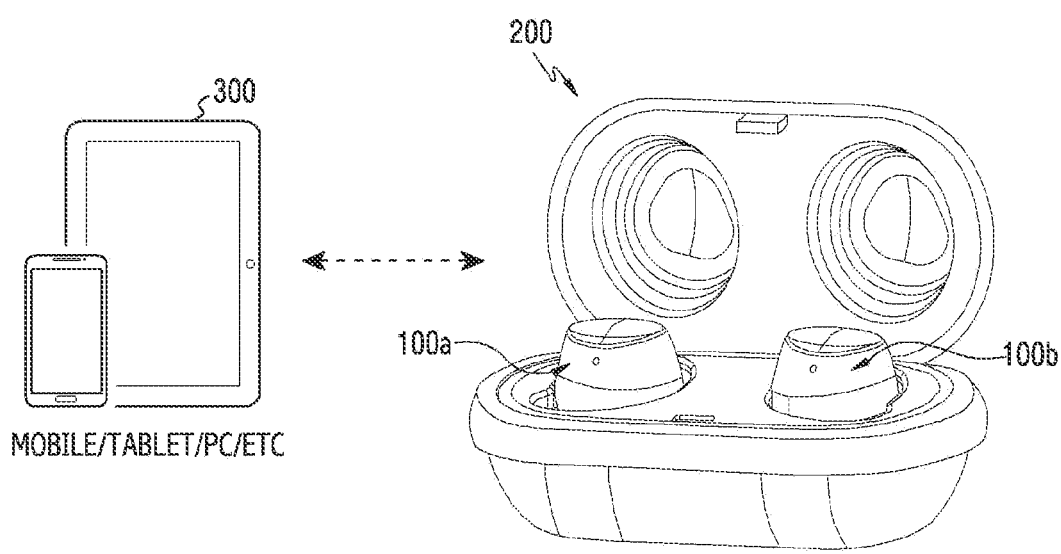
FIG. 2 illustrates a view of an audio output device received in a power supply device, and an external electronic device according to an embodiment.

FIG. 2 illustrates a view of the audio output device 100 received in the power supply device 200, and the external electronic device 300 according to an embodiment.

Referring to FIG. 2, the power supply device 200 may have a hinged structure, and the audio output device 100 may be received in a recess (for example, the first receiver 202 or the second receiver 204 of FIG. 1) formed in the power supply device 200 when the power supply device 200 is opened. The audio output device 100 may be received by having at least part thereof seated in the recess of the power supply device 200.

According to an embodiment, the audio output device 100 may include a sensed member corresponding to a sensor of the power supply device 200 although it is not illustrated. For example, the power supply device 200 may include a hall sensor (or a hall integrated circuit (IC)) and the audio output device 100 may include a magnet. When the audio output device 100 is received in the power supply device 200, the hall sensor of the power supply device 200 may recognize that the audio output device 100 is received in the power supply device 200, and may transmit the recognized state to the audio output device 100. In another example, the audio output device 100 may include a hall sensor, and the audio output device 100 may directly detect that a lid of the power supply device 200 is closed by using the hall sensor. That is, the power supply device 200 may detect that the audio output device 100 is received in the power supply device 200 and the lid of the power supply device 200 is closed, and may control the audio output device 100, and the audio output device 100 may detect that the lid of the power supply device 200 is closed by using the hall sensor, and may control itself.

According to an embodiment, when the power supply device 200 recognizes that the audio output device 100 is received in the power supply device 200, the power supply device 200 may supply power to the audio output device 100 through an interface (for example, the first interface 206 and/or the second interface 204). For example, the audio output device 100 may recognize that the audio output device 100 is received in the power supply device 200, based on power being received from the power supply device 200 through an interface (for example, the first interface 102 and/or the second interface 104).

According to an embodiment, the power supply device 200 may receive state information (for example, a remaining battery capacity) of the audio output device 100 through communication (for example, power line communication (PLC)) with the audio output device 100, and may control charging of the audio output device 100 based on the state information (for example, the remaining battery capacity) of the audio output device 100. For example, when state information (for example, a remaining battery capacity) of the first audio output device 100a and state information (for example, a remaining battery capacity) of the second audio output device 100b are different from each other by a designated threshold value or more, the power supply device 200 may control charging to make the first audio output device 100a and the second audio output device 100b have substantially the same remaining battery capacity.

According to an embodiment, when the audio output device 100 is received in the power supply device 200 and receives power from the power supply device 200, the audio output device 100 may disable a wireless communication circuit (or a wireless data exchange path) of the audio output device 100.

Figure 3:
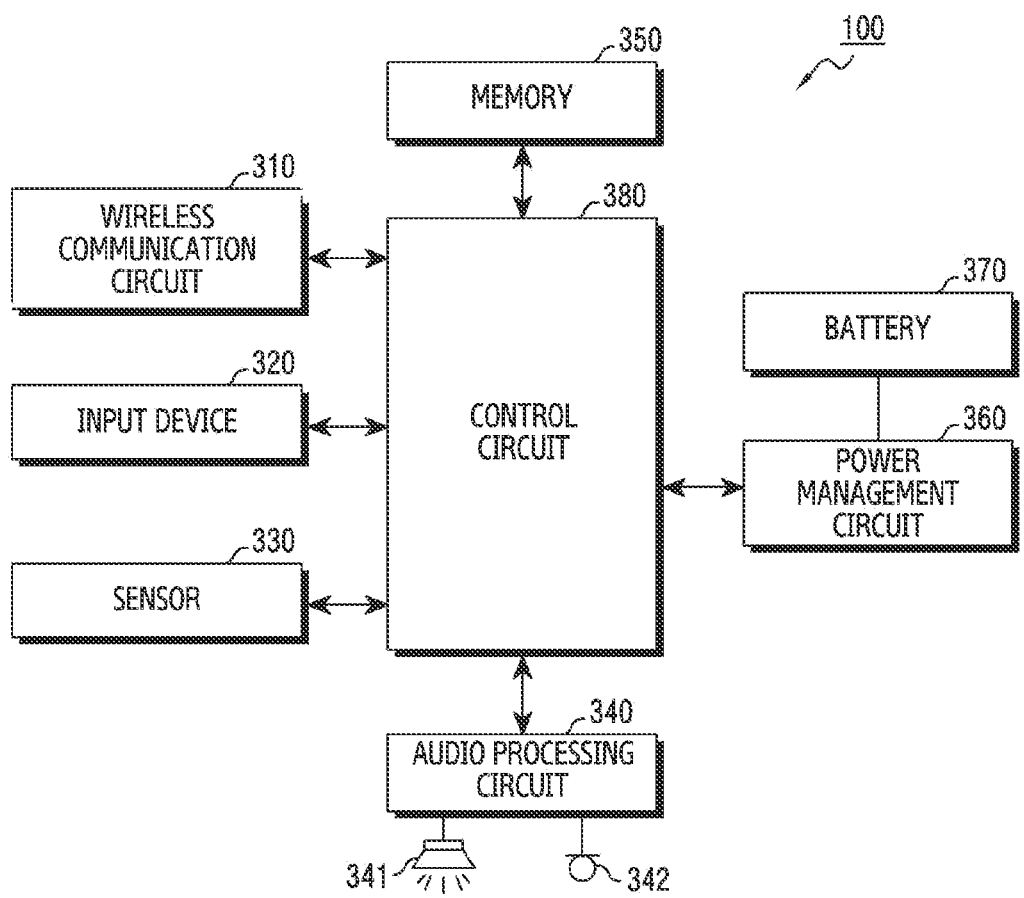
FIG. 3 illustrates a block diagram of an audio output device according to an embodiment.

FIG. 3 illustrates a block diagram of the audio output device 100 according to an embodiment.

Referring to FIG. 3, the audio output device 100 (for example, the first audio output device 100a and/or the second audio output device 100b) may include a plurality of electronic components disposed in an inner space thereof. According to an embodiment, the audio output device 100 may include a wireless communication circuit 310, an input device 320, a sensor 330, an audio processing circuit 340, a speaker 341, a microphone 342, a memory 350, a power management circuit 360, a battery 370, and a control circuit 380. However, this should not be considered as limiting, and one or more of the electronic components may be omitted or other electronic components may further be included.

In various embodiments of the disclosure, the audio output device 100 may refer to at least one of the first audio output device 100a and the second audio output device 100b, or may refer to a device of the first audio output device 100a and the second audio output device 100b that connects communication with the external electronic device 300 (for example, a master device of the first audio output device 100a and the second audio output device 100b that connects communication with the external electronic device 300).

According to an embodiment, the wireless communication circuit 310 may support communication of various types by using an antenna. According to an embodiment, the wireless communication circuit 310 may support reception of audio data from an external device (for example, a server, a smartphone, a PC, a personal digital assistant (PDA), or an access point) (for example, the external electronic device 300 of FIG. 1). According to an embodiment, the wireless communication circuit 310 may support transmission of audio data to an external device (for example, another audio output device).

According to an embodiment, the input device 320 may be configured to generate various input signals necessary for operating the audio output device 100. The input device 320 may include a touch pad, a touch panel, and/or a button. For example, the touch pad may recognize a touch input in at least one method of capacitive, resistive, infrared and ultrasonic methods. For example, the button may include a physical button and/or an optical button.

According to an embodiment, the input device 320 may generate a user input related to power on or off of the audio output device 100. According to an embodiment, the input device 320 may generate a user input related to communication (for example, short-range communication) connection with the audio output device 100 and an external device.

According to an embodiment, the input device 320 may generate a user input related to audio data (or audio content). For example, the user input may be related to functions such as starting play of audio data, pausing, stopping, adjusting a replay speed, adjusting a replay volume or muting.

According to an embodiment, the sensor 330 may measure physical data related to the audio output device 100 or may detect an operation state of the audio output device 100. In addition, the sensor 330 may convert the measured or detected information into an electric signal. According to an embodiment, the sensor 330 may include at least one of a proximity sensor, an acceleration sensor, a gyro sensor, a geomagnetic sensor, a magnetic sensor, a gesture sensor, a grip sensor, or a biometric sensor. According to an embodiment, the sensor 330 may detect information or a signal regarding whether the audio output device 100 is worn on user's body.

According to an embodiment, the audio processing circuit 340 may support an audio data collecting function and may reproduce collected audio data. According to an embodiment, the audio processing circuit 340 may include an audio decoder and a digital-to-analogue (D/A) converter. The audio decoder may convert audio data stored in the memory 350 into a digital audio signal, and the D/A converter may convert the digital audio signal converted by the audio decoder into an analogue audio signal. According to an embodiment, the audio decoder may convert audio data received from an external device (for example, a server, a smartphone, a PC, a PDA, or an access point) through the wireless communication circuit 310 and stored in the memory 350 into a digital audio signal. The speaker 341 may output the analogue audio signal converted by the D/A converter. According to an embodiment, the audio processing circuit 340 may include an analogue-to-digital (A/D) converter. The A/D converter may convert an analogue voice signal delivered through the microphone 342 into a digital voice signal.

According to an embodiment, the audio processing circuit 340 may reproduce various audio data set in an operating action of the audio output device 100. For example, when it is detected that the audio output device 100 is worn on ears or is separated from ears, the audio processing circuit 340 may be designed to reproduce audio data related to a corresponding effect or a sound guide. According to another embodiment, when it is detected that the audio output device 100 is coupled to another electronic device (for example, the power supply device 200) or it is detected when the audio output device 100 is separated from another electronic device, the audio processing circuit 340 may be designed to reproduce audio data related to a corresponding effect or a sound guide. According to another embodiment, when the audio output device 100 receives a signal for requesting to output an alarm (or a notification) from another electronic device (for example, the power supply device 200, the external electronic device 300), the audio processing circuit 340 may be designed to reproduce audio data corresponding to a corresponding effect or a sound guide. Outputting a sound effect or a sound guide may be omitted according to user settings or a designer's intention. According to an embodiment, the audio processing circuit 340 may be designed to be included in the control circuit 380.

The memory 350 may store various operating systems necessary for operating the audio output device 100, and data or an application program corresponding to various user functions, and algorithms. The memory 350 may include, for example, a high-speed random access memory and/or a non-volatile memory such as one or more magnetic disk storage device, one or more optical storage devices and/or a flash memory (for example, NAND, NOR).

According to an embodiment, the memory 350 may include a nonvolatile memory which stores nonvolatile audio data received from an external device (for example, a server, a smartphone, a PC, a PDA, or an access point). According to an embodiment, the memory 350 may include a volatile memory which stores volatile audio data received from an external device.

The power management circuit 360 (for example, a power management integrated circuit (PMIC)) may efficiently manage and optimize use of power of the battery 370 in the audio output device 100. According to an embodiment, the control circuit 380 may transmit a signal resulting from a load to process to the power management circuit 360 according to the load. The power management circuit 360 may adjust power to be supplied to the control circuit 380.

The power management circuit 360 may include a battery charging circuit. According to an embodiment, when the audio output device 100 is coupled to the power supply device 200, the power management circuit 360 may receive power from the power supply device 200 and may charge the battery 370. According to an embodiment, the power management circuit 360 may support power line communication (PLC) between the audio output device 100 and the power supply device 200, and the audio output device 100 may exchange data with the power supply device 200 through PLC.

According to an embodiment, the power management circuit 360 may include a wireless charging circuit. The wireless charging circuit may wirelessly receive power from an external device, and may charge the battery 370 by using the received power. According to an embodiment, the wireless charging circuit may support in-band communication between the audio output device 100 and the power supply device 200. For example, when the in-band communication is used, the audio output device 100 and the power supply device 200 may communicate through the wireless charging circuit by using the same frequency or adjacent frequency to transmit power. In this case, the wireless charging circuit may transmit and receive data between the audio output device 100 and the power supply device 200 by using a frequency shift keying (FSK) modulation scheme and an amplitude shift keying (ASK) modulation scheme.

According to an embodiment, the control circuit 380 may be configured to collect various data and to calculate a target output value. According to an embodiment, the control circuit 380 may support various actions based on least part of a user input from the input device 320.

The control circuit 380 may be designed to receive audio data from an external device (for example, a server, a smartphone, a PC, a PDA, or an access point) through the wireless communication circuit 310, and to store the received audio data in the memory 350. According to an embodiment, the control circuit 380 may receive nonvolatile audio data (or downloaded audio data) from the external device, and may store the received nonvolatile audio data in the nonvolatile memory. According to an embodiment, the control circuit 380 may receive volatile audio data (or streaming audio data) from the external device, and may store the received volatile audio data in the volatile memory.

According to an embodiment, the control circuit 380 may control to reproduce audio data (for example, nonvolatile audio data or volatile audio data) stored in the memory 350 and to output the audio data through the speaker 341. The control circuit 380 may acquire an audio signal by decoding audio data, and may control to output the acquired audio signal through the speaker 341.

According to an embodiment, the control circuit 380 may perform various actions based on at least part of information acquired from the sensor 330. For example, the control circuit 380 may determine whether the audio output device 100 is worn on a user's body, based on information acquired from the sensor 330.

According to an embodiment, in a mode in which the audio output device 100 receives audio data from an external device and outputs the audio data through the speaker 341, when it is identified that the audio output device 100 is not worn on a user's body (for example, the audio output device 100 is received in the power supply device 200), the control circuit 380 may stop the mode or may transmit a relevant signal to the external device. According to an embodiment, the external device may receive the signal regarding the state in which the audio output device 100 is not worn on a user's body, and may stop transmitting the audio data to the audio output device 100. According to another embodiment, the external device may stop transmitting the audio data to the audio output device 100, based on the audio output device 100 disabling the wireless communication circuit 310. For example, when the audio output device 100 is received in the power supply device 200, the audio output device 100 may disable the wireless communication circuit 310, and based on this, the external device may stop transmitting the audio data to the audio output device 100.

According to an embodiment, the control circuit 380 may control the audio processing circuit 340 to reproduce audio data related to a corresponding sound effect or a sound guide in response to an alarm output request signal received from the power supply device 200 and/or the external electronic device 300.

According to an embodiment, the audio output device 100 may further include various components according to a providing form thereof. In addition, specific components out of the above-described components may be excluded or may be substituted with other components according to a providing form of the audio output device 100.

Figure 4:
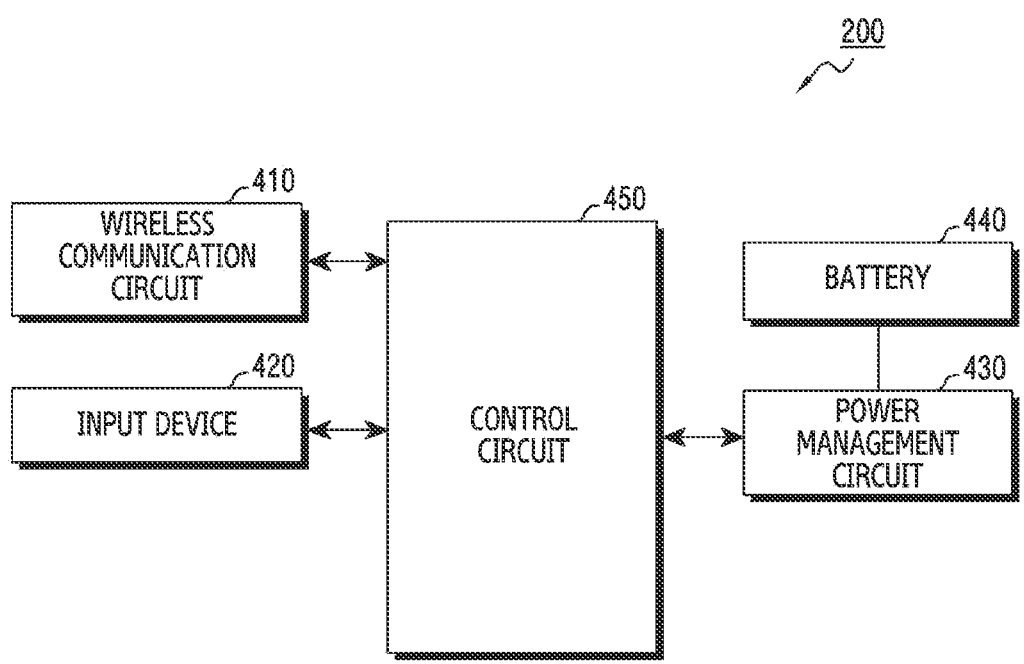
FIG. 4 illustrates a block diagram of a power supply device according to an embodiment.

FIG. 4 illustrates a block diagram of a power supply device 200 according to an embodiment.

Referring to FIG. 4, the power supply device 200 may include a plurality of electronic components disposed in an inner space thereof. According to an embodiment, the power supply device 200 may include a wireless communication circuit 410, an input device 420, a power management circuit 430, a battery 440, and a control circuit 450. However, this should not be considered as limiting, and one or more of the electronic components may be omitted or other electronic components may further be included. Corresponding components in FIGS. 3 and 4 may perform the same function.

In the disclosure, the power supply device 200 may refer to a case device that receives the audio output device 100, and may refer to a case device that, when the audio output device 100 is received in the power supply device 200, charges the battery 370 of the audio output device 100.

According to an embodiment, the wireless communication circuit 410 may support wireless communication of various types by using an antenna. For example, the wireless communication circuit 410 may support Bluetooth communication and/or Bluetooth low energy (BLE) communication. According to an embodiment, the wireless communication circuit 410 may establish wireless communication connection with an external device (for example, the audio output device 100, the external electronic device 300), and may support exchange of data.

According to an embodiment, the input device 420 may be configured to generate various input signals necessary for operating the power supply device 200. The input device 420 may include a touch pad, a touch panel, and/or a button. For example, the touch pad may recognize a touch input n at least one method of capacitive, resistive, infrared, and ultrasonic methods. For example, the button may include a physical button and/or an optical button.

According to an embodiment, the input device 420 may generate a user input related to power on or off of the power supply device 200. According to an embodiment, the input device 420 may generate a user input related to communication (for example, short-range communication) connection with the power supply device 200 and an external device.

According to an embodiment, the power management circuit 430 (for example, a power management integrated circuit (PMIC)) may efficiently manage and optimize use of power of the battery 440 in the power supply device 200. According to an embodiment, the control circuit 450 may transmit a signal resulting from a load to process to the power management circuit 430 according to the load. The power management circuit 430 may adjust power to be supplied to the control circuit 450.

According to an embodiment, the power management circuit 430 may include a charging circuit. According to an embodiment, the power management circuit 430 may receive power from an external power source (for example, a travel adapter (TA)) and may charge the battery 440.

According to an embodiment, the power management circuit 430 may include a wireless charging circuit. The wireless charging circuit may wirelessly receive power from an external device, and may charge the battery 440 by using the received power.

The power management circuit 430 may include a power transmission circuit. According to an embodiment, when the audio output device 100 is received in the power supply device 200 and is electrically connected thereto, the power management circuit 430 may transmit power charged in the battery 440 of the power supply device 200 to the audio output device 100, and may charge the battery 370 of the audio output device 100. According to an embodiment, the power management circuit 430 may support PLC between the audio output device 100 and the power supply device 200, and the power supply device 200 may exchange data with the audio output device through PLC.

According to an embodiment, the control circuit 450 may be configured to collect various data and to calculate a target output value. According to an embodiment, the control circuit 450 may support various actions, based on at least part of a user input from the input device 420.

According to embodiment, the control circuit 450 may control the wireless communication circuit 410 to always operate in a connection standby mode or an advertise mode, and may control the wireless communication circuit 410 to receive a communication packet from the external electronic device 300.

According to an embodiment, the power supply device 200 may further include various components according to a providing form thereof. In addition, specific components out of the above-described components may be excluded or substituted with other components according to a providing form of the power supply device 200. For example, the power supply device 200 may further include a sensor, an audio processing circuit, and/or a memory.

Figure 5:
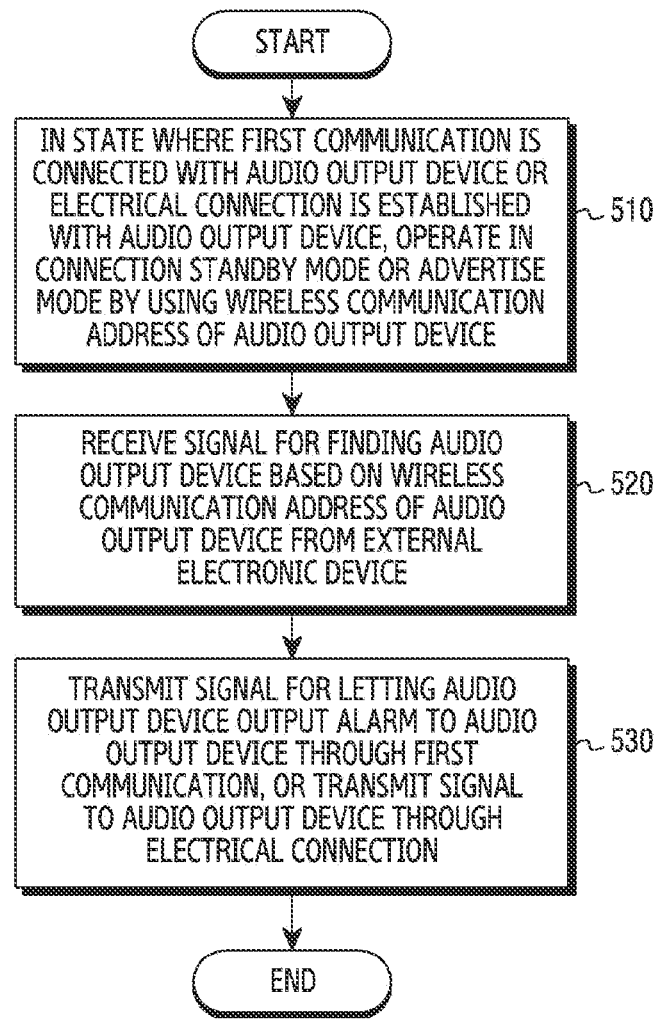
FIG. 5 illustrates a flowchart to explain a method for finding a position of an audio output device by using a power supply device according to an embodiment.

FIG. 5 illustrates a flowchart to explain a method for finding a position of the audio output device 100 by using the power supply device 200 according to an embodiment.

In an embodiment described below, respective actions may be performed in sequence, but may not necessarily be performed in sequence. The order of the respective actions may be changed or at least two actions may be performed in parallel.

Actions of FIG. 5 may be performed by the power supply device 200 of FIG. 4.

Referring to FIG. 5, the control circuit 450 of the power supply device 200 according to an embodiment may perform: action 510 of operating in a connection standby mode or an advertise mode by using a wireless communication address of the audio output device 100 in a state where the power supply device 200 connects a first communication with the audio output device 100 or is electrically connected with the audio output device 100; action 520 of receiving, from the external electronic device 300, a signal for finding the audio output device 100 based on the wireless communication address of the audio output device 100; and action 530 of transmitting a signal for letting the audio output device 100 output an alarm to the audio output device 100 through the first communication, or transmitting the signal to the audio output device 100 through the electrical connection. Hereinafter, the respective actions of FIG. 5 will be described in detail.

According to an embodiment, in action 510, in the state where the power supply device 200 connects wireless communication with the audio output device 100 or is electrically connected with the audio output device 100, the control circuit 450 of the power supply device 200 may operate in the connection standby mode or the advertise mode by using the wireless communication address of the audio output device 100. According to an embodiment, in action 510, the power supply device 200 may be in the state where wireless communication (for example, Bluetooth communication, BLE communication) is connected with the audio output device 100, or the power supply device 200 is electrically connected with the audio output device 100. In this case, communication between the audio output device 100 and the external electronic device 300 may be disconnected.

For example, the power supply device 200 may connect wireless communication with the audio output device. According to an embodiment, the power supply device 200 may connect Bluetooth communication with the audio output device 100 by using the wireless communication circuit 410, and the control circuit 450 may transmit and receive data (for example, a battery state of the audio output device 100, information on whether the audio output device 100 is worn or not, information of the sub audio output device 100) between the audio output device 100 and the power supply device 200 through the Bluetooth communication.

In another example, the power supply device 200 may be electrically connected with the audio output device 100. According to an embodiment, when the audio output device 100 is received in the power supply device 200, a terminal (for example, the first interface 206, the second interface 208 of FIG. 1) of the power supply device 200, and a terminal (for example, the first interface 102, the second interface 104 of FIG. 1) of the audio output device 100 may be electrically connected in contact with each other, and the control circuit 450 may perform PLC between the audio output device 100 and the power supply device 200.

According to an embodiment, in the state where Bluetooth communication is connected with the audio output device 100 or PLC is connected with the audio output device 100, the control circuit 450 of the power supply device 200 may operate in the connection standby mode or the advertise mode by using the wireless communication address (for example, a Bluetooth address) of the audio output device 100. For example, when the power supply device 200 has a history of having connected Bluetooth communication with the audio output device 100, the power supply device 200 may know the Bluetooth address of the audio output device 100, and may know the Bluetooth address of the audio output device 100 through PLC between the audio output device 100 and the power supply device 200. In another example, the power supply device 200 may store the Bluetooth address of the audio output device 100 in the memory the first time it is designed, and may be produced. According to an embodiment, the Bluetooth address may be unique identification information or address information based on which a target to connect is identified when Bluetooth communication is connected and communication connection is established.

According to an embodiment, the control circuit 450 which recognizes the Bluetooth address of the audio output device 100 may operate in the connection standby mode for Bluetooth (or Bluetooth legacy) communication or the advertise mode for BLE communication by using the Bluetooth address of the audio output device 100. According to an embodiment, in the state where Bluetooth communication is connected with the audio output device 100 or PLC is connected with the audio output device 100, the control circuit 450 may continuously (or always) operate in the connection standby mode by using the Bluetooth address of the audio output device 100, or may continuously (always) operate in the advertise mode by using the Bluetooth address of the audio output device 100. According to another embodiment, the control circuit 450 may periodically operate in the connection standby mode or in the advertise mode by using the Bluetooth address of the audio output device 100.

According to an embodiment, the control circuit 450 may perform a page scan action in the connection standby mode for Bluetooth legacy communication, and may perform an action of transmitting an advertising signal to a peripheral electronic device including the external electronic device 300 in the advertise mode for BLE communication.

According to an embodiment, a page scan mode may be a state in which a paging request is received from another peripheral electronic device including the external electronic device 300 to establish Bluetooth (or Bluetooth legacy) communication connection. For example, the power supply device 200 operating in the page scan mode may receive a communication connection request from the external electronic device 300, and then, may receive data (for example, a signal for finding the audio output device 100) from the external electronic device 300.

According to an embodiment, the advertise mode may be a state in which an advertising signal is periodically transmitted to another peripheral electronic device including the external electronic device 300 to use BLE communication. For example, the power supply device 200 operating in the advertise mode may receive a response signal (for example, a signal for finding the audio output device 100) from the external electronic device 300 which receives the advertising signal.

Actions using the Bluetooth legacy communication will be described below in FIG. 6, and actions using the BLE communication will be described below in FIG. 7.

According to another embodiment, in the state where Bluetooth communication is connected with the audio output device 100 or PLC is connected with the audio output device 100, when the battery 440 of the power supply device 200 is less than or equal to a predetermined threshold value, the control circuit 450 may enable the audio output device 100, and may request the audio output device 100 to operate in the wireless communication connection standby mode or the advertise mode. In this case, even when the battery 440 of the power supply device 200 is discharged and power is turned off, a user may find a position of the audio output device 100 through wireless communication between the external electronic device (for example, the external electronic device 300 of FIG. 1) and the audio output device 100.

According to an embodiment, in action 520, the control circuit 450 of the power supply device 200 may receive the signal for finding the audio output device 100 from the external electronic device 300, based on the wireless communication address of the audio output device 100. For example, the control circuit 450 may connect Bluetooth communication with the external electronic device 300 based on the wireless communication address of the audio output device 100, and may receive the signal for finding the audio output device 100. In another example, the control circuit 450 may receive the signal for finding the audio output device 100 from the external electronic device 300, as a response to the advertising signal using the wireless communication address of the audio output device 100.

According to an embodiment, the control circuit 450 may connect Bluetooth communication with the external electronic device 300 with the wireless communication address of the audio output device 100 in response to the request of the external electronic device 300 for finding the audio output device 100, and may receive a packet including the signal for finding audio output device 100 through the connected communication.

According to another embodiment, the control circuit 450 may not connect wireless communication with the external electronic device 300, and may receive the signal for finding the audio output device 100. For example, when the control circuit 450 operating in the page scan mode receives a wireless communication connection request from the external electronic device 300 in the state where the audio output device 100 is received in the power supply device 200, the control circuit 450 may recognize the wireless communication connection request as the signal for finding the audio output device 100.

According to another embodiment, the control circuit 450 may receive a packet including the signal for finding the audio output device 100 from the external electronic device 300, as a response signal (for example, a scan request signal) to the advertising, in response to a request of the external electronic device 300 for searching the audio output device 100. In this case, the audio output device 100 and the power supply device 200 may not connect wireless communication with each other.

According to an embodiment, in response to the signal received in action 520, in action 530, the control circuit 450 of the power supply device 200 may transmit a signal for the audio output device 100 to output an alarm to the audio output device 100 through wireless communication (that is, Bluetooth communication with the audio output device 100), or may transmit the signal to the audio output device 100 through electrical connection (that is, PLC with the audio output device 100).

For example, in the state where Bluetooth communication is connected between the power supply device 200 and the audio output device 100, the control circuit 450 of the power supply device 200 may transmit the signal for letting the audio output device 100 output the alarm, received from the external electronic device 300, to the audio output device 100 through the Bluetooth communication. That is, even when a distance between the external electronic device 300 and the power supply device 200 is short and short-range wireless communication is used, but a distance between the external electronic device 300 and the audio output device 100 is long and short-range wireless communication is not used, the external electronic device 300 may transmit a command for the audio output device 100 to output an alarm to the audio output device 100 by using the power supply device 200.

In another example, in the state where PLC is connected between the power supply device 200 and the audio output device 100, the control circuit 450 of the power supply device 200 may transmit the signal for letting the audio output device 100 output the alarm, received from the external electronic device 300, to the audio output device 100 through the PLC. That is, even when the audio output device 100 is received in the power supply device 200 and communication between the external electronic device 300 and the audio output device 200 is disconnected, the external electronic device 300 may transmit, to the audio output device 100, the command for the audio output device 100 to output the alarm by using the power supply device 200.

According to an embodiment, the audio output device 100 which receives the signal for outputting the alarm from the power supply device 200 may control the audio processing circuit to output a sound effect or a sound guide, and may inform the user of its position.

According to an embodiment, when the audio output device 100 is in a disabled state, the control circuit 450 of the power supply device 200 may transmit, to the audio output device 100 through the PLC, a signal for enabling the audio output device 100 and a signal for letting the audio output device 100 output the alarm.

According to an embodiment, the audio output device 100 which receives the signal for enabling the audio output device 100 and the signal for outputting the alarm from the power supply device 200 may enable at least one disabled circuit (for example, the audio processing circuit 340), and may control the audio processing circuit 340 to output a sound effect or a sound guide.

According to another embodiment, when an audio processing circuit is included in the power supply device 200, the control circuit 450 of the power supply device 200 may control its own audio processing circuit to directly output a sound effect or a sound guide with the audio output device 100 being received in the power supply device 200. In this case, the audio output device 100 which receives the signal for outputting the alarm from the power supply device 200, and the power supply device 200 may output the sound effect or the sound guide. In another example, the control circuit 450 of the power supply device 200 may also output a vibration with the sound effect or the sound guide with the audio output device 100 being received in the power supply device 200.

According to an embodiment, when the charge of the battery 370 of the audio output device 100 is less than or equal to a predetermined threshold value, the control circuit 450 of the power supply device 200 may control its own audio processing circuit to directly output the sound effect or the sound guide. In this case, even when the battery 370 of the audio output device 100 is almost discharged, the user may find the position of the audio output device 100 through the alarm outputted from the power supply device 200.

According to an embodiment, when the audio output device 100 is received in the power supply device 200, the control circuit 450 may transmit information indicating that the audio output device 100 is in the power supply device 200 to the external electronic device 300 by using Bluetooth communication. In this case, the external electronic device 300 may display the information indicating that the audio output device 100 is in the power supply device, and the user may identify the information and may find the position of the audio output device 100 and/or the power supply device 200 which outputs the alarm. According to an embodiment, the control circuit 450 may transmit the information indicating that the audio output device 100 is in the power supply device and state information (for example, a battery charging rate) of the audio output device 100 to the external electronic device 300.

According to an embodiment, when the audio output device 100 is received in the power supply device 200, the external electronic device 300 may output information regarding the position of the audio output device 100 to the user by using augmented reality (AR). In this case, the external electronic device 300 may be AR glasses (or VR glasses). For example, when the external electronic device 300 indicates the power supply device 200, the external electronic device 300 may display information regarding the state of the audio output device 100 received in the power supply device 200 by using AR technology. In another example, the external electronic device 300 may display guide information regarding a direction and/or a distance of the position of the audio output device 100 received in the power supply device 200. According to an embodiment, when the audio output device 100 is not received in the power supply device 200, the power supply device 200 may perform an additional function (for example, a relay function) for finding the audio output device 100. For example, when the external electronic device 300 indicates the power supply device 200, the power supply device 200 may output information regarding a direction in which the audio output device 100 is positioned with reference to the external electronic device 300 (or the power supply device 200). In this case, the external electronic device 300 may output a notification in a different method from that when the audio output device 100 is received in the power supply device 200.

According to an embodiment, the above-described function of finding the position of the audio output device 100 by using the power supply device 200 in FIG. 5 may be performed when a specific application (for example, an application for controlling an electronic device of a user account) is executed in the external electronic device 300. According to an embodiment, not only Bluetooth communication but also ultra-wide band (MB) communication may be supported between the external electronic device 300 and the power supply device 200. When UWB communication is used, more exact information on the distance and/or direction of the audio output device 100 may be provided.

According to another embodiment, when the audio output device 100 is received in the power supply device 200, the power supply device 200 may receive the signal for finding the audio output device 100 (and/or the power supply device 200) by using its own wireless communication address. In this case, the power supply device 200 may operate in the page scan mode or in the advertise mode by using the wireless communication address of the power supply device 200. A method for finding the audio output device 100 by using the wireless communication address of the power supply device 200 will be described in detail with reference to FIG. 14.

Figure 6:
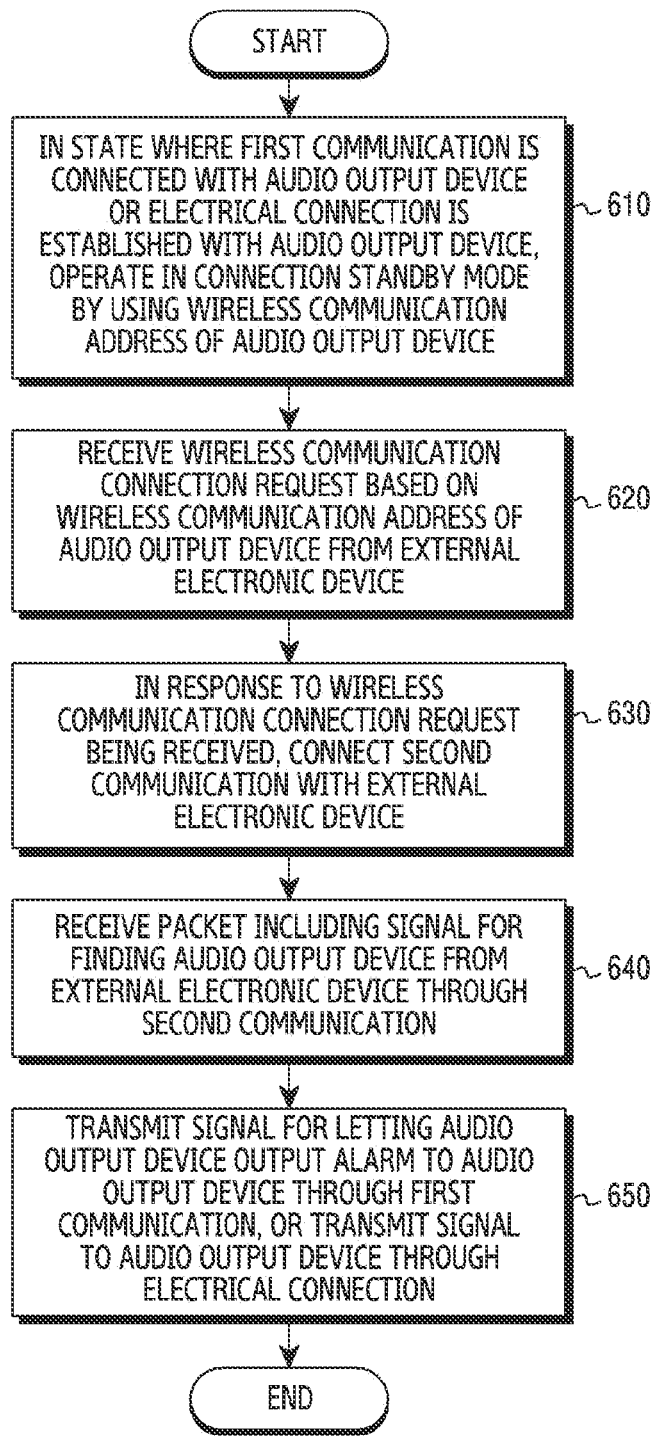
FIG. 6 illustrates a flowchart to explain a method for finding a position of an audio output device through a power supply device by using wireless communication (for example, Bluetooth legacy) according to an embodiment.

FIG. 6 illustrates a flowchart to explain a method for finding a position of the audio output device 100 through the power supply device 200 by using wireless communication (for example, Bluetooth legacy) according to an embodiment.

Actions of FIG. 6 may be performed by the power supply device 200 of FIG. 4.

Referring to FIG. 6, the control circuit 450 of the power supply device 200 according to an embodiment may perform: action 610 of, in a state where the power supply device 200 connects a first communication with the audio output device 100 or is electrically connected with the audio output device 100, operating in a connection standby mode by using a wireless communication address of the audio output device 100; action 620 of receiving a wireless communication connection request from the external electronic device 300, based on the wireless communication address of the audio output device 100; action 630 of connecting second communication with the external electronic device 300 in response to the wireless communication connection request being received; action 640 of receiving a packet including a signal for finding the audio output device 100 from the external electronic device 300 through the second communication; and action 650 of transmitting a signal for letting the audio output device 100 output an alarm to the audio output device 100 through the first communication or transmitting the signal to the audio output device 100 through the electrical connection.

Action 610 of FIG. 6 may correspond to action 510 of FIG. 5, action 640 of FIG. 6 may correspond to action 520 of FIG. 5, and action 650 of FIG. 6 may correspond to action 530 of FIG. 5. Descriptions of portions corresponding to those described in FIG. 5 or repeated descriptions will be omitted, and the respective actions of FIG. 6 will be described.

According to an embodiment, in action 610, the control circuit 450 of the power supply device 200 may operate in the connection standby mode by using the wireless communication address (for example, a Bluetooth address) of the audio output device 100 in the state where the power supply device 200 connects wireless communication with the audio output device 100 or is electrically connected with the audio output device 100, and in action 620, may receive, from the external electronic device 300, a wireless communication (for example, Bluetooth or Bluetooth legacy) connection request based on the wireless communication address of the audio output device 100.

According to an embodiment, the control circuit 450 may perform a page scan action in the connection standby mode of action 610. For example, a page scan mode may be a state in which a paging request is received from another peripheral electronic device including the external electronic device 300 to establish Bluetooth (or Bluetooth legacy) communication connection. According to an embodiment, while operating in the page scan mode, the control circuit 450 may receive a Bluetooth communication connection request (that is, a paging request) based on the wireless communication address of the audio output device 100 from the external electronic device 300 in action 620. In another example, when the audio output device 100 is received in the power supply device 200, the control circuit 450 may recognize the Bluetooth communication connection request received from the external electronic device 300 as a signal for finding the audio output device 100.

According to an embodiment, in the state where wireless communication is connected with the audio output device 100 or the power supply device 200 is electrically connected with the audio output device 100, the control circuit 450 may always (or continuously) operate in the page scan mode by using the wireless communication circuit 410, or may periodically operate in the page scan mode by using the wireless communication circuit 410.

According to an embodiment, in response to the wireless communication (for example, Bluetooth or Bluetooth legacy) connection request being received in action 620, the control circuit 450 of the power supply device 200 may connect wireless communication (for example, Bluetooth or Bluetooth legacy) with the external electronic device 300 in action 630. According to an embodiment, the control circuit 450 may receive a paging request using the wireless communication address of the audio output device 100 from the external electronic device 300, and may connect wireless communication with the external electronic device 300 by responding to the paging. For example, the control circuit 450 may perform page scanning by using the Bluetooth address of the audio output device 100, and in this case, the control circuit 450 may receive only the paging request using the Bluetooth address of the audio output device 100 from a peripheral electronic device (for example, the external electronic device 300), and may connect Bluetooth communication.

According to an embodiment, in action 640, the control circuit 450 of the power supply device 200 may receive the packet including the signal for finding the audio output device 100 from the external electronic device 300 through the wireless communication (that is, Bluetooth or Bluetooth legacy communication) connected with the external electronic device 300. According to an embodiment, when wireless communication is connected between the power supply device 200 and the external electronic device 300, the power supply device 200 and the external electronic device 300 may exchange data with each other by exchanging a communication packet including the data. For example, when Bluetooth communication is connected between the power supply device 200 and the external electronic device 300, the external electronic device 300 may transmit the packet including the signal for finding the audio output device 100 to the power supply device 200, and the power supply device 200 may receive the packet.

For example, the packet including the signal for finding the audio output device 100 may be configured as shown in table 1 presented below:

TABLE 1

| Classification | SOM (1 byte) | Header LSB (1 byte) | Header MSB (1 byte) | Msg ID (2 byte) | Left Earbud Mute (1 byte) | right Earbud Mute (1 byte) | EOM (1 byte) |
|---|---|---|---|---|---|---|---|
| Contents | 0xFD | 0x0A | 0x00 | 0xA0 | 0x00 | 0X01 | 0xDD |

According to an embodiment, the signal for finding the audio output device 100 may include a signal for requesting a command for the audio output device 100 to output an alarm to be transmitted to the audio output device 100.

According to an embodiment, in response to the signal received in action 640, in action 650, the control circuit 450 of the power supply device 200 may transmit a signal for letting the audio output device 100 output an alarm to the audio output device 100 through wireless communication (that is, Bluetooth communication with the audio output device 100), or may transmit the signal to the audio output device 100 through electrical connection. Action 650 may correspond to description of action 530 of FIG. 5, and thus a detailed description thereof is omitted.

According to another embodiment, when wireless communication connection is not established between the power supply device 200 and the external electronic device 300, action 630 and action 640 may be omitted. For example, in a state where the audio output device 100 is received in the power supply device 200, when the control circuit 450 operating in the connection standby mode receives a wireless communication connection request from the external electronic device 300 in action 620, the control circuit 450 may recognize the wireless communication connection request as the signal for finding the audio output device 100, and may transmit the signal for letting the audio output device 100 output the alarm to the audio output device 100 in action 650.

Figure 7:
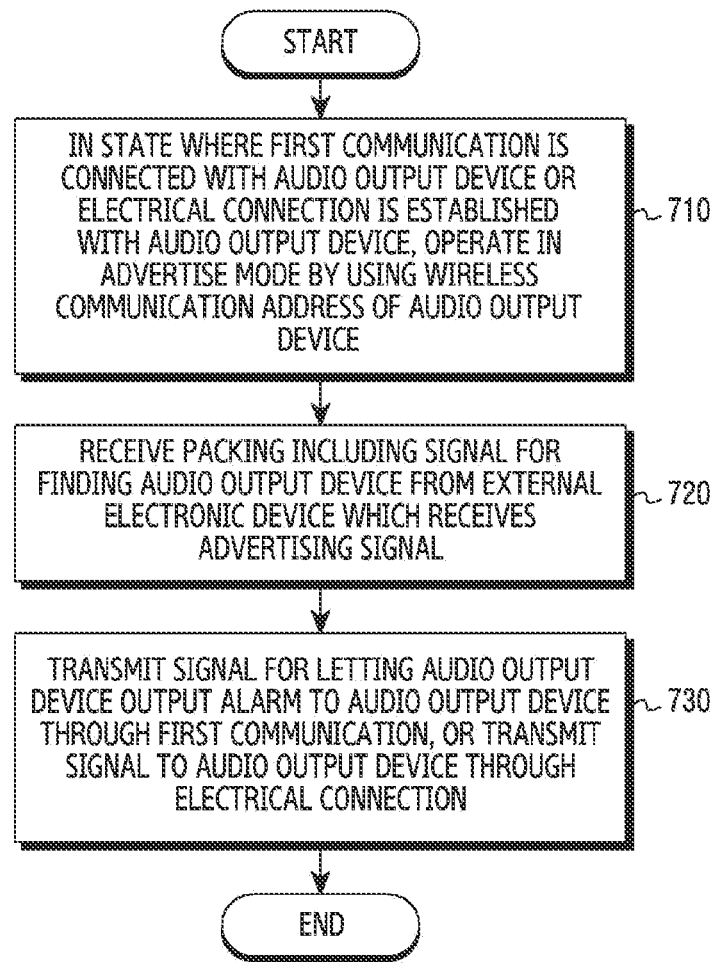
FIG. 7 illustrates a flowchart to explain a method for finding a position of an audio output device through a power supply device by using an advertising signal according to an embodiment.

FIG. 7 illustrates a flowchart to explain a method for finding a position of the audio output device 100 through the power supply device 200 by using an advertising signal according to an embodiment.

Actions of FIG. 7 may be performed by the power supply device 200 of FIG. 4,

Referring to FIG. 7, the control circuit 450 of the power supply device 200 according to an embodiment may perform: action 710 of, in a state where a first communication is connected with the audio output device 100 or the power supply device 200 is electrically connected with the audio output device 100, operating in an advertise mode by using a wireless communication address of the audio output device 100; action 720 of receiving a packet including a signal for finding the audio output device 100 from the external electronic device 300 which receives an advertising signal; and action 730 of transmitting a signal for letting the audio output device 100 output an alarm to the audio output device 100 through the first communication, or transmitting the signal to the audio output device 100 through electrical connection.

Action 710 of FIG. 7 may correspond to action 510 of FIG. 5, action 720 of FIG. 7 may correspond to action 520 of FIG. 5, and action 730 of FIG. 7 may correspond to action 530 of FIG. 5. Hereinafter, descriptions of portions corresponding to those described in FIG. 5 or repeated descriptions will be omitted, and the respective actions of FIG. 7 will be described.

According to an embodiment, in action 710, in the state where wireless communication is connected with the audio output device 100 or the power supply device 200 is electrically connected with the audio output device 100, the control circuit 450 of the power supply device 200 may operate in the advertise mode by using the wireless communication address (for example, a Bluetooth address) of the audio output device 100. According to an embodiment, when BLE communication is used, the control circuit 450 may perform an action of transmitting an advertising signal to another peripheral electronic device including the external electronic device 300 in the advertise mode. For example, in the advertise mode, the control circuit 450 may not exchange information with a specific electronic device with which communication is connected, but may transmit the advertising signal to all electronic devices existing on the periphery of the power supply device 200. For example, in the case of BLE communication, it may be possible to transmit data in one direction by using the advertising signal.

According to an embodiment, in the state where wireless communication is connected with the audio output device 100 or the power supply device 200 is electrically connected with the audio output device 100, the control circuit 450 may always (or continuously) transmit the advertising signal by using the wireless communication circuit 410, or may periodically transmit the advertising signal by using the wireless communication circuit 410.

According to an embodiment, in action 720, the control circuit 450 of the power supply device 200 may receive the packet including the signal for finding the audio output device 100 from the external electronic device 300, which receives the advertising signal. According to an embodiment, the external electronic device 300 may receive the signal while the power supply device 200 is transmitting the advertising signal, and may transmit a response packet to the power supply device 200 in response to the received advertising signal. According to an embodiment, the external electronic device 300 may include data in the response packet, and may transmit the response packet. For example, the external electronic device 300 may include the signal for finding the audio output device 100 in the response packet, and may transmit the response packet to the power supply device 200.

According to an embodiment, the signal for finding the audio output device 100 may include a signal for requesting a command for the audio output device 100 to output an alarm to be transmitted to the audio output device 100.

According to an embodiment, in response to the signal received in action 720, in action 730, the control circuit 450 of the power supply device 200 may transmit the signal for letting the audio output device 100 output the alarm to the audio output device 100 through wireless communication (for example, Bluetooth communication with the audio output device 100), or may transmit the signal to the audio output device 100 through electrical connection. Action 730 may correspond to description of action 530 of FIG. 5, and thus a detailed description thereof is omitted.

According to an embodiment, in action 510 (or action 610 or action 710), the power supply device 200 may operate in the page scan mode or in the advertise mode by using a first Bluetooth address of the first audio output device 100a and/or a second Bluetooth address of the second audio output device 100b. For example, the power supply device 200 may operate in the page scan mode or in the advertise mode by using only the first Bluetooth address of a master device. In another example, the power supply device 200 may operate in the page scan mode or in the advertise mode by alternately using the first Bluetooth address and the second Bluetooth address with reference to a predetermined period.

In the embodiments described above with reference to FIGS. 5 to 7, the external electronic device 300 may receive a request for finding the audio output device 100 from the user. However, this should not be considered as limiting, and the external electronic device 300 may receive, from the user, a request for finding the power supply device 200 or a request for finding the audio output device 100 and the power supply device 200.

According to an embodiment, when the power supply device 200 receives the request for finding the power supply device 200 from the external electronic device 300 in the middle of operating in the connection standby mode or in the advertise mode by using the wireless communication address of the audio output device 100, the action of transmitting the signal for letting the audio output device 100 output the alarm to the audio output device 100 may be omitted. That is, when the power supply device 200 receives the request for finding the power supply device 200 from the external electronic device 300, the power supply device 200 may directly output an alarm (for example, a sound effect, a sound guide and/or a vibration).

According to an embodiment, when the power supply device 200 receives the request for finding the audio output device 100 and the power supply device 200 from the external electronic device 300 in the middle of operating in the connection standby mode or in the advertise mode by using the wireless communication address of the audio output device 100, the power supply device may transmit the signal for letting the audio output device 100 output the alarm to the audio output device 100, while directly outputting the alarm (for example, a sound effect, a sound guide sound, and/or a vibration).

Figure 8:
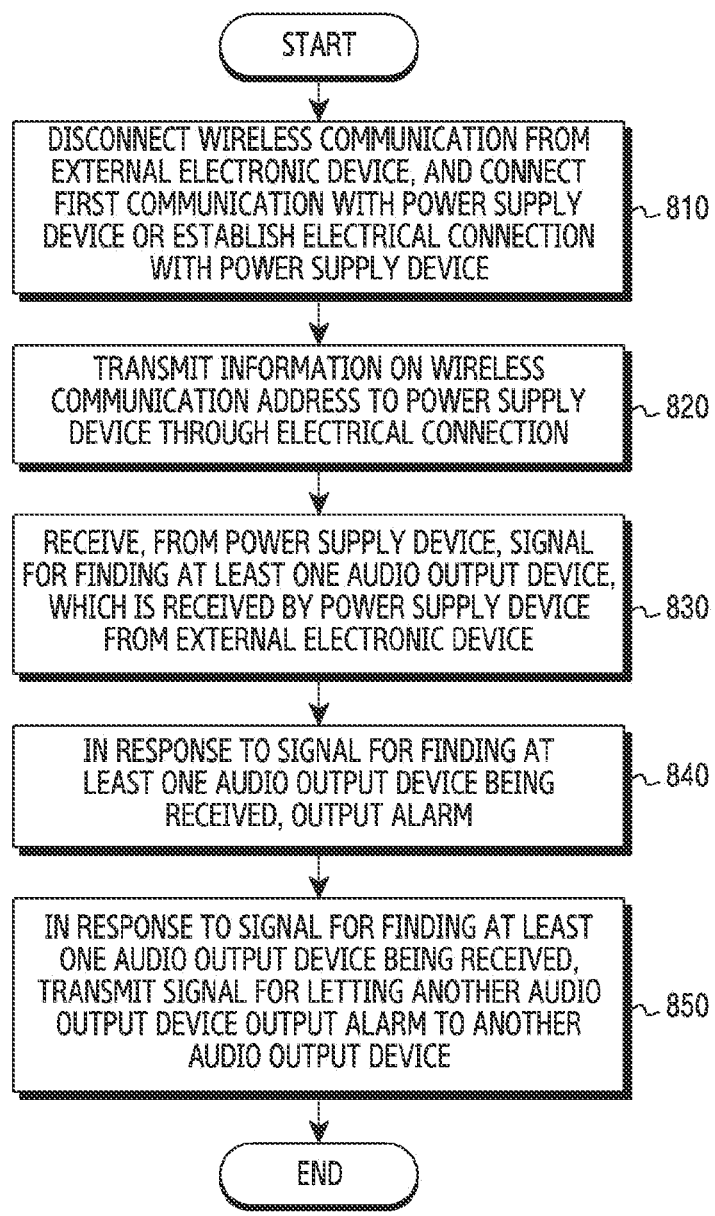
FIG. 8 illustrates a flowchart to explain a method for outputting an alarm based on a signal received from a power supply device in an audio output device according to an embodiment.

FIG. 8 illustrates a flowchart to explain a method for the audio output device 100 to output an alarm based on a signal received from the power supply device 200 according to an embodiment.

Actions of FIG. 8 may be performed by the audio output device 100 of FIG. 3.

Referring to FIG. 8, the control circuit 380 of the audio output device 100 according to an embodiment may perform: action 810 of disconnecting wireless communication from the external electronic device 300, and establishing a first communication connection with the power supply device 200 or electrical connection with the power supply device 200; action 820 of transmitting information regarding a wireless communication address to the power supply device 200 through the electrical connection; action 830 of receiving a signal for finding at least one audio output device 100, received by the power supply device 200 from the external electronic device 300, from the power supply device 200 through the first communication connection or the electrical connection with the power supply device 200; action 840 of outputting an alarm in response to the signal for finding the at least one audio output device 100 being received; and action 850 of transmitting a signal for letting another audio output device 100 output an alarm to another audio output device 100 in response to the signal for finding the at least one audio output device 100 being received.

In the following embodiments, the respective actions may be performed in sequence, but may not necessarily be performed in sequence. The order of the respective actions may be changed and at least two actions may be performed in parallel. For example, action 820 and/or action 850 may be omitted, and action 840 and action 850 may be performed substantially at the same time. Hereinafter, the respective actions of FIG. 8 will be described in detail.

According to an embodiment, in action 810, the control circuit 380 of the audio output device 100 may disconnect wireless communication from the external electronic device 300, and may establish wireless communication connection with the power supply device 200 or electrical connection with the power supply device 200, and in action 820, the control circuit 380 of the audio output device 100 may transmit information regarding a wireless communication address of the audio output device 100 to the power supply device 200 through the electrical connection.

For example, when the audio output device 100 is received in the power supply device 200, the control circuit 380 of the audio output device 100 may disable the audio output device 100 or may disable at least one function of the audio output device 100, and may disconnect wireless communication (for example, Bluetooth communication) from the external electronic device 300. In addition, when the audio output device 100 is received in the power supply device 200, the control circuit 380 of the audio output device 100 may connect PLC with the power supply device 200 through electrical connection. In this case, the control circuit 380 may transmit information regarding the wireless communication address (for example, a Bluetooth address) of the audio output device 100 to the power supply device 200 through PLC. According to an embodiment, when the power supply device 200 already knows the information of the Bluetooth address of the audio output device 100, action 820 may be omitted.

In another example, in the state where wireless communication (for example, Bluetooth communication) is disconnected from the external electronic device 300, the control circuit 380 of the audio output device 100 may connect wireless communication (for example, Bluetooth communication) with the power supply device 200. According to an embodiment, the control circuit 380 may connect wireless communication with the power supply device 200 by using at least one method of relay, sniffing, TWS+ methods among Bluetooth communication methods. In this case, the power supply device 200 may already know information regarding the wireless communication address (for example, a Bluetooth address) of the audio output device 100, and action 820 may be omitted.

According to an embodiment, in action 830, the control circuit 380 of the audio output device 100 may receive the signal for finding at least one audio output device 100, received by the power supply device 200 from the external electronic device 300, from the power supply device 200 through the first communication connection or the electrical connection with the power supply device 200. For example, in the state where communication with the external electronic device 300 is disconnected, the audio output device 100 may receive the signal for finding the audio output device 100 through the power supply device 200. According to an embodiment, the audio output device 100 may receive the signal for finding the audio output device 100 or a packet including the signal through the first communication (for example, Bluetooth communication) or PLC connected with the power supply device 200.

According to an embodiment, the signal for finding the audio output device 100 may be a signal that is received by the power supply device 200 from the external electronic device 300 through communication established with the external electronic device 300 by using the Bluetooth address of the audio output device 100. According to an embodiment, the signal for finding the audio output device 100 may include a signal for letting the audio output device 100 output an alarm.

According to an embodiment, in action 840, the control circuit 380 of the audio output device 100 may output an alarm in response to the signal for finding at least one audio output device 100 being received. According to an embodiment, the control circuit 380 may control the audio processing circuit 340 to output a predetermined sound effect or sound guide and to inform the user of its own position. According to an embodiment, when the audio output device 100 is disabled, the control circuit 380 of the audio output device 100 may enable the audio output device 100 or may enable at least one disabled circuit (for example, the audio processing circuit 340) to output the predetermined sound effect or sound guide, in response to the signal for finding at least one audio output device 100 being received.

According to an embodiment, in action 850, the control circuit 380 of the audio output device 100 (for example, the first audio output device 100a) may transmit a signal for letting another audio output device 100 to output an alarm to another audio output device 100 (for example, the second audio output device 100b) in response to the signal for finding at least one audio output device 100 being received. According to an embodiment, when the audio output device 100 and the power supply device 200 communicate by using the relay method or sniffing method, wireless communication may be connected between the first audio output device 100a and the second audio output device 100b which forms a pair. In this case, the first audio output device 100a may transmit a signal for letting the second audio output device 100b to output an alarm in response to the signal for finding at least one audio output device 100 being received. According to an embodiment, the first audio output device 100a may be a master device and the second audio output device 100b may be a slave device. According to an embodiment, the first audio output device 100a may transmit the signal for letting the second audio output device 100b to output an alarm by using PLC with the power supply device 200. For example, the power supply device 200 may perform PLC with the first audio output device 100a and the second audio output device 100b, and the first audio output device 100a may transmit the signal to the second audio output device 100b through the power supply device 200.

According to an embodiment, when the audio output device 100 and the power supply device 200 communicate by using the TWS+ method, action 850 may be omitted.

According to an embodiment, not only Bluetooth communication but also UWB may be supported between the external electronic device 300 and the power supply device 200. For example, when the power supply device 200 receives the signal for finding the audio output device 100 from the external electronic device 300 based on the wireless communication address of the audio output device 100, the power supply device 200 may provide information regarding a distance and/or a direction of the audio output device 100 to the external electronic device 300 by using UWB communication.

Figure 9:
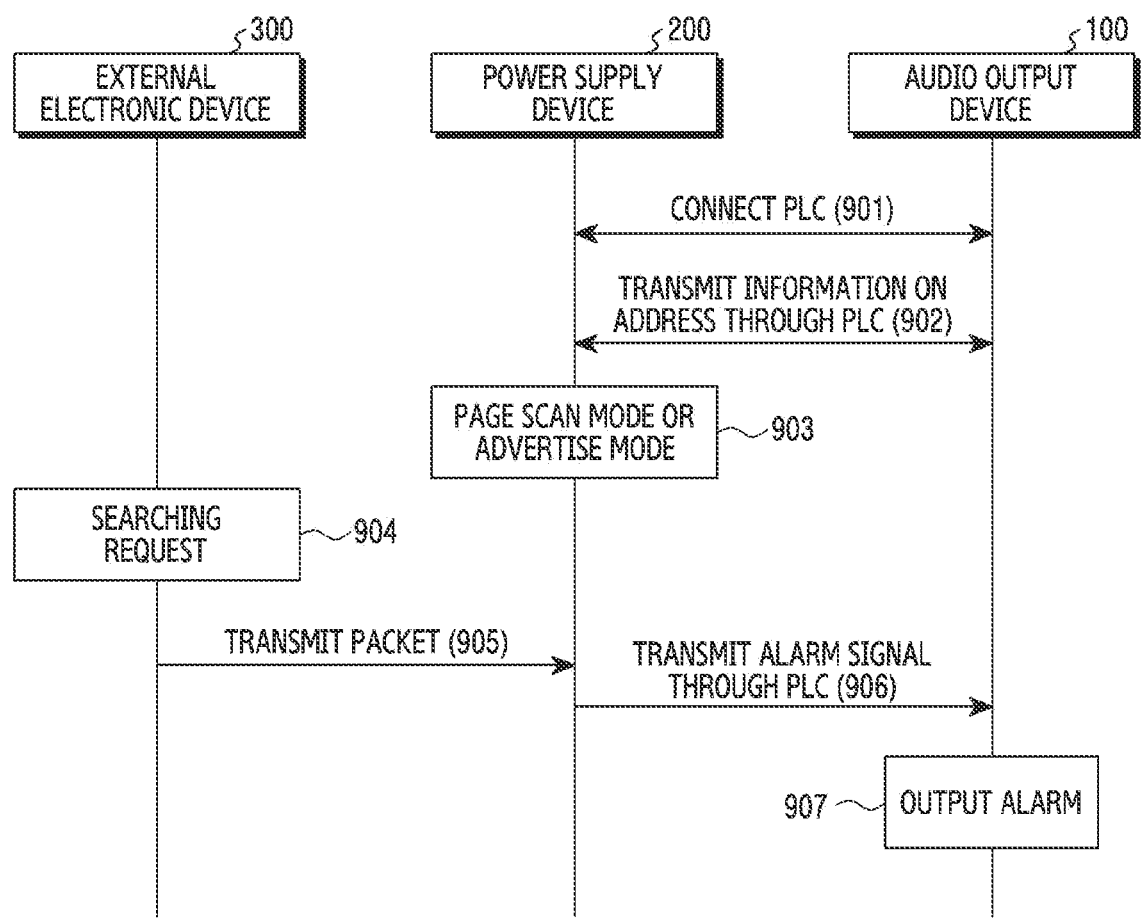
FIG. 9 illustrates a flowchart to explain a method for finding an audio output device, based on a request of an external electronic device according to an embodiment.
Figure 10:
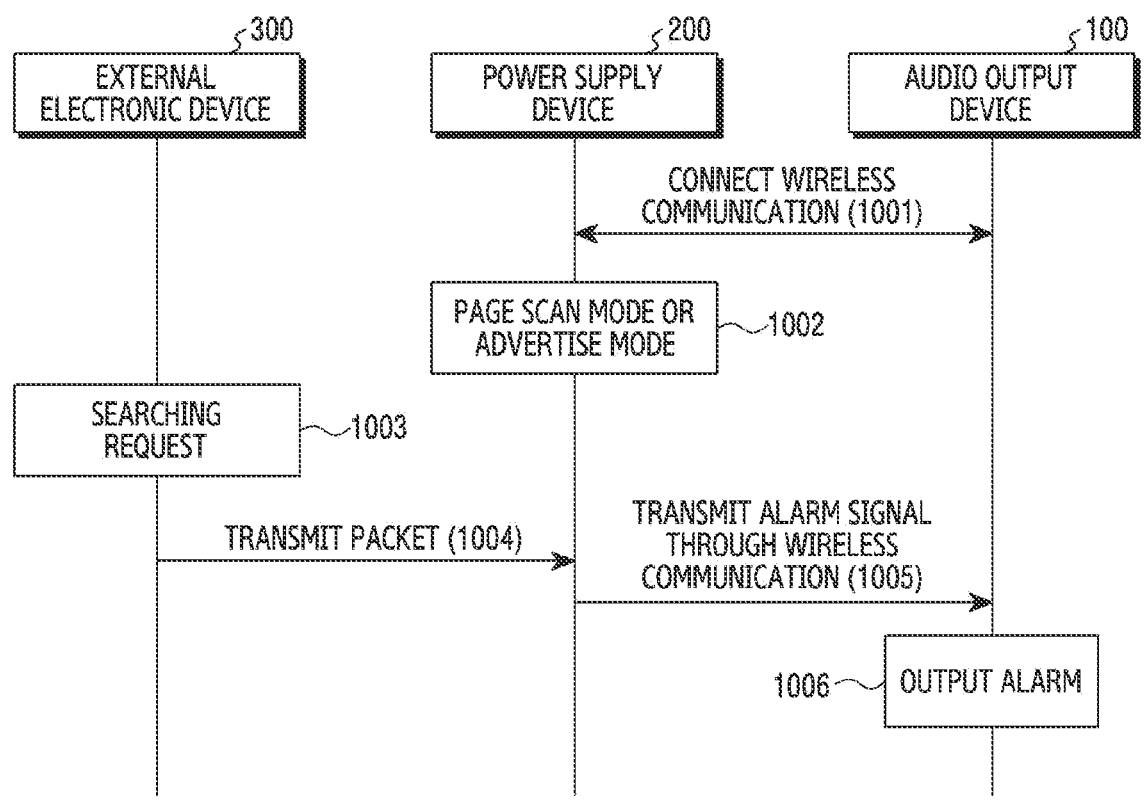
FIG. 10 illustrates a flowchart to explain a method for finding an audio output device, based on a request of an external electronic device according to an embodiment.

FIGS. 9 and 10 illustrate flowcharts to explain a method for finding the audio output device 100, based on a request of the external electronic device 300 according to an embodiment. FIG. 9 is a flowchart of an embodiment in which PLC is connected between the power supply device 200 and the audio output device 100 in a state where the audio output device 100 is received in the power supply device 200, and FIG. 10 is a flowchart of an embodiment in which wireless communication is connected between the power supply device 200 and the audio output device 100 in a state where the power supply device 200 and the audio output device 100 are spaced apart from each other.

Hereinafter, the actions of FIG. 5 will be described again with reference to FIGS. 9 and 10.

Referring to FIG. 9, in action 901, the power supply device 200 may be in a state in which PLC is connected with the audio output device 100. For example, when the audio output device 100 is received in the power supply device 200, a terminal (for example, the first interface 206, the second interface 208 of FIG. 1) of the power supply device 200 and a terminal (for example, the first interface 102, the second interface 104 of FIG. 1) of the audio output device 100 may be electrically connected in contact with each other, and the power supply device 200 may perform PLC with the audio output device 100. In action 902, the power supply device 200 according to an embodiment may receive information regarding a Bluetooth address of the audio output device 100 through PLC with the audio output device 100. In action 903, the power supply device 200 according to an embodiment may operate in a page scan mode or in an advertise mode by using the Bluetooth address of the audio output device 100. Actions 901 to 903 may correspond to description of action 510 of FIG. 5

According to an embodiment, while the power supply device 200 is operating in the page scan mode or in the advertise mode by using the Bluetooth address of the audio output device 100, the external electronic device 300 may receive a searching request for the audio output device 100 (for example, a user input for finding the audio output device 100) in action 904. According to an embodiment, in response to the searching request, the external electronic device 300 may transmit a communication packet including a signal for finding the audio output device 100 to the power supply device 200 in action 905. For example, the external electronic device 300 may connect Bluetooth communication with the power supply device 200 which operates in the scan mode, by using the Bluetooth address of the audio output device 100, and may transmit the packet including the signal for finding the audio output device 100 to the power supply device 200. In another example, the external electronic device 300 may transmit the packet including the signal for finding the audio output device 100 to the power supply device 200, which operates in the advertise mode by using the Bluetooth address of the audio output device 100, as a response signal. Actions 904 to 905 may correspond to description of action 520 of FIG. 5.

In action 905, the power supply device 200 according to an embodiment may receive the communication packet including the signal for finding the audio output device 100 from the external electronic device 300. In action 906, the power supply device 200 according to an embodiment may transmit a signal for letting the audio output device 100 output an alarm to the audio output device 100 through PLC with the audio output device 100.

According to an embodiment, in response to the alarm signal received from the power supply device 200, the audio output device 100 may reproduce audio data related to a sound effect or a sound guide in action 907. According to an embodiment, a user may find the position of the audio output device 100 by searching a position of the outputted sound effect or sound guide. Actions 906 to 907 may correspond to description of operation 520 of FIG. 5.

Referring to FIG. 10, in action 1001, the power supply device 200 may be in a state where wireless communication is connected with the audio output device 100. For example, the power supply device 200 may connect wireless communication with the audio output device 100 by using at least one of relay, sniffing and MS-F methods among the Bluetooth communication methods. The power supply device 200 according to an embodiment may operate in a page scan mode or an advertise method in action 1002 by using a Bluetooth address of the audio output device 100 which is used for Bluetooth communication connection with the audio output device 100. Actions 1001 to 1002 may correspond to description of action 510 of FIG. 5.

Actions 1003 to 1004 may correspond to actions 904 to 905 of FIG. 9, and thus a redundant explanation thereof is omitted.

In action 1004, the power supply device 200 according to an embodiment may receive a communication packet including a signal for finding the audio output device 100 from the external electronic device 300, and in action 1005, the power supply device 200 may transmit a signal for letting the audio output device 100 output an alarm to the audio output device 100 through wireless communication (for example, Bluetooth communication).

Action 1006 may correspond to action 907 of FIG. 9 and thus a redundant explanation thereof is omitted.

Hereinafter, a method for finding at least one audio output device 100 according to a communication connection method between the audio output device 100 and the power supply device 200 when one pair of audio output devices 100 is used in action 1001 will be described with reference to FIGS. 11 to 13.

FIG. 11 illustrates a view to explain various Bluetooth communication connection methods between the audio output device 100a 100b and the power supply device 200 according to an embodiment.

FIG. 11 illustrates various methods of connecting Bluetooth communication between the plurality of audio output devices 100a, 100b and the power supply device 200. However, the communication connection method between the audio output device 100a, 100b and the power supply device 200 is not limited thereto, and for example, the above-described PLC connection may be usable.

Figure 11C:
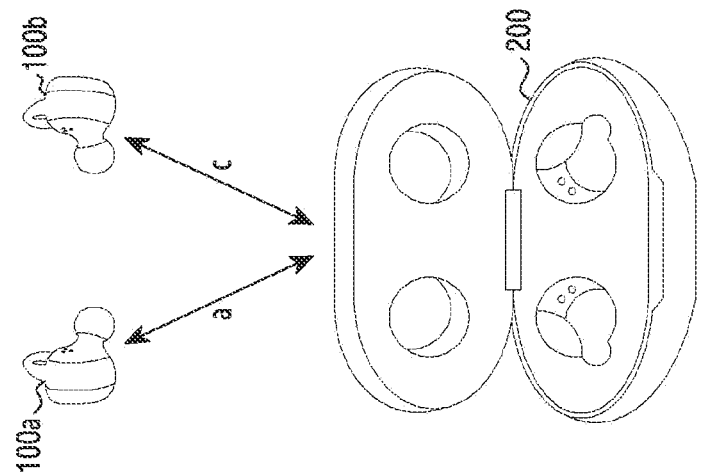
FIGS. 11A to 11C illustrate views to explain various Bluetooth communication connection methods between an audio output device and a power supply device according to an embodiment.
Figure 11B:
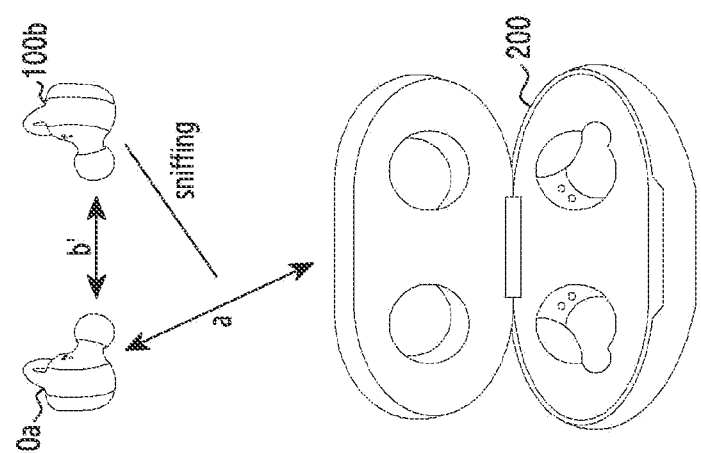
Figure 11A:
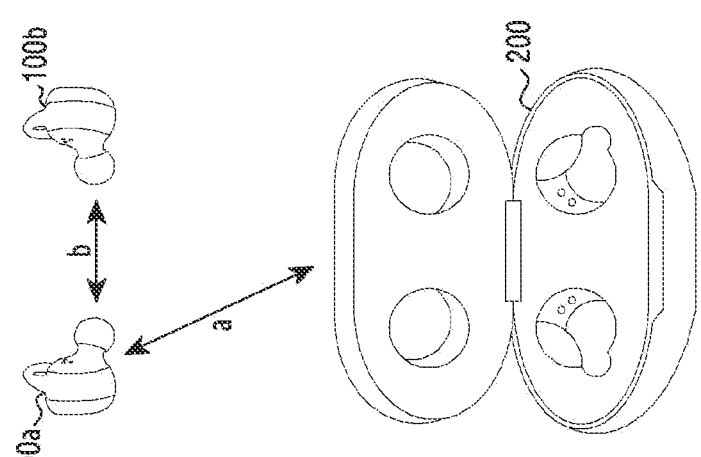

FIG. 11A illustrates an embodiment in which Bluetooth communication of a relay method is connected between the audio output device 100a, 100b and the power supply device 200. According to an embodiment, when Bluetooth communication of the relay method is connected between the audio output device 100a, 100b and the power supply device 200, the power supply device 200 may connect communication (a) with the first audio output device 100a, which is a master device, and the first audio output device 100a which is the master device may connect communication (b) with the second audio output device 100b which is a slave device.

FIG. 11B illustrates an embodiment in which Bluetooth communication of a sniffing method is connected between the audio output device 100a, 100b and the power supply device 200. According to an embodiment, when Bluetooth communication of the sniffing method is connected between the audio output device 100a, 100b and the power supply device 200, the power supply device 200 may connect communication (a) with the first audio output device 100a, which is a master device, and the first audio output device 100a which is the master device may connect communication (b') with the second audio output device 100b which is a slave device. In this case, the second audio output device 100 may sniff data which is transmitted and received between the power supply device 200 and the first audio output device 100a, based on information regarding the communication path (a) between the power supply device 200 and the first audio output device 100a.

FIG. 11C illustrates an embodiment in which Bluetooth communication of a TWS+ method is connected between the audio output device 100a, 100b and the power supply device 200. According to an embodiment, when Bluetooth communication of the TWS+ method is connected between the audio output device 100a, 100b and the power supply device 200, the power supply device 200 may connect communication (a) with the first audio output device 100a, and the first audio output device 100a may separately connect communication (c) with the second audio output device 100b. In this case, the first audio output device 100a and the second audio output device 100b may transmit and receive information by connecting communication with the power supply device 200, respectively.

Figure 12:
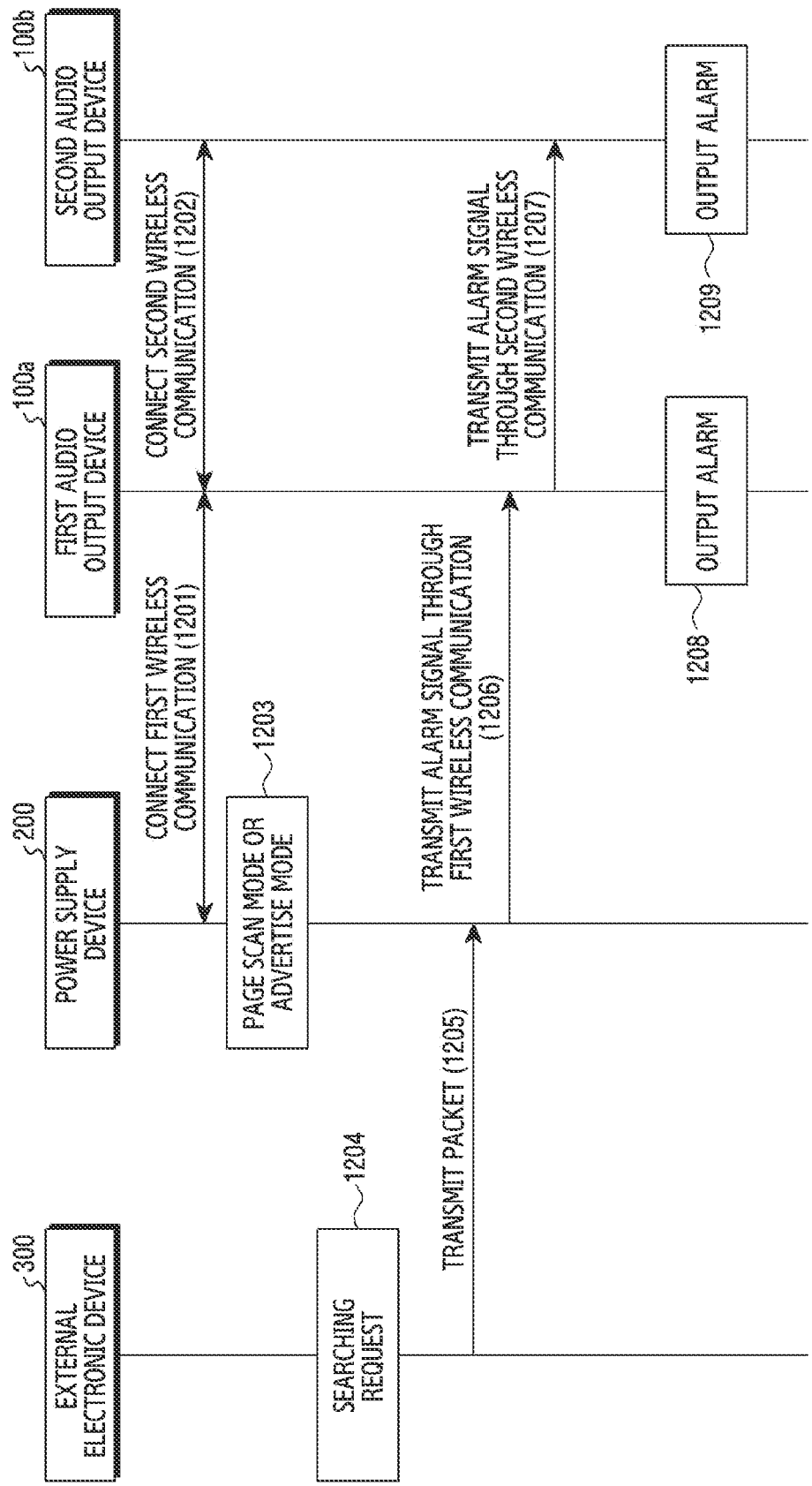
FIG. 12 illustrates a flowchart to explain a method for finding at least one audio output device in a communication connection state of FIG. 11A or 11B, based on a request of an external electronic device according to an embodiment.

FIG. 12 illustrates a flowchart to explain a method for finding at least one audio output device 100a, 100b in the communication connection state of FIG. 11A or 11B, based on a request of the external electronic device 300 according to an embodiment.

Referring to FIG. 12, in action 1201, the power supply device 200 may be in a state in which first wireless communication is connected with the first audio output device 100a, and in action 1202, the first audio output device 100a may be in a state in which second wireless communication is connected with the second audio output device 100b. For example, the first audio output device 100a and the second audio output device 100b may connect wireless communication with the power supply device 200 by using at least one of the relay method and the sniffing method among the Bluetooth communication methods. The power supply device 200 according to an embodiment may know a first Bluetooth address of the first audio output device 100a in the process of establishing the first communication connection with the first audio output device 100a. In addition, the power supply device 200 according to an embodiment may receive information regarding a second Bluetooth address of the second audio output device 100b through the first communication connection.

According to an embodiment, in action 1203, the power supply device 200 may operate in a page scan mode or operate in an advertise mode by using the first Bluetooth address and/or the second Bluetooth address. For example, the power supply device 200 may operate in the page scan mode or in the advertise mode by using only the first Bluetooth address of the master device. In another example, the power supply device 200 may operate in the page scan mode or in the advertise mode by alternately using the first Bluetooth address and the second Bluetooth address with reference to a predetermined period.

According to an embodiment, while the power supply device 200 is operating in the page scan mode or in the advertise mode by using the first Bluetooth address and/or the second Bluetooth address, the external electronic device 300 may receive a searching request for the audio output device 100a, 1100b (for example, a user input for finding the audio output device 100) in action 1204. For example, the external electronic device 300 may distinguish between a user input for finding the first audio output device 100a and a user input for finding the second audio output device 100b, and may receive the user input. In another example, the external electronic device 300 may receive a user input for finding both the first audio output device 100a and the second audio output device 100b.

According to an embodiment, in response to the searching request, in action 1205, the external electronic device 300 may transmit a communication packet including a signal for finding at least one of the first audio output device 100a and the second audio output device 100b to the power supply device 200. For example, the external electronic device 300 may connect Bluetooth communication with the power supply device 200, which operates in the scan mode by using the first Bluetooth address and/or the second Bluetooth address, and may transmit the packet including the signal for finding at least one of the first audio output device 100a and the second audio output device 100b to the power supply device 200. In another example, the external electronic device 300 may transmit the packet including the signal for finding at least one of the first audio output device 100a and the second audio output device 100b to the power supply device 200, which operates in the advertise mode, as a response signal.

According to an embodiment, in action 1205, the power supply device 200 may receive the communication packet including the signal for finding at least one of the first audio output device 100*a* and the second audio output device 100*b* from the external electronic device 300, and in action 1206, the power supply device 200 may transmit, to the first audio output device 100*a*, a signal for letting at least one of the first audio output device 100*a* and the second audio output device 100*b* output an alarm, through the first wireless communication with the first audio output device 100*a*.

According to an embodiment, when the first audio output device 100*a*, receives a signal for letting the first audio output device 100*a* output the alarm from the power supply device 200, the first audio output device 100*a* may reproduce audio data related to a sound effect or a sound guide in action 1208. According to an embodiment, when the first audio output device 100*a* reproduces the audio data related to the sound effect or the sound guide in action 1208, the sound effect or sound guide reproduced by the first audio output device 100*a* may vary according to the presence/absence of the second audio output device 100, the presence/absence of actions 1207 and 1209. For example, a type and/or a volume of the sound effect or sound guide reproduced by the first audio output device 100*a* may vary according to the presence/absence of the second audio output device 100*b*.

According to an embodiment, when the first audio output device 100*a* receives a signal for letting the second audio output device 100*b* to output an alarm from the power supply device 200, the first audio output device 100*a* may transmit the signal for letting the second audio output device 100*b* output the alarm to the second audio output device 100*b* through a second wireless communication in action 1207. According to an embodiment, when the second audio output device 100*b* receives the signal for letting the second audio output device 100*b* output the alarm from the first audio output device 100*a*, the second audio output device 100*b* may reproduce audio data related to a sound effect or a sound guide.

According to an embodiment, when the first audio output device 100*a* receives a signal for letting the first audio output device 100*a* and the second audio output device 100*b* output an alarm from the power supply device 200, the first audio output device 100*a* may reproduce audio data related to a sound effect or a sound guide in action 1208, and may transmit a signal for letting the second audio output device 100*b* output an alarm to the second audio output device 100*b* in action 1207. In this case, the second audio output device 100*b* may also reproduce audio data related to a sound effect or a sound guide in action 1209.

Figure 13:
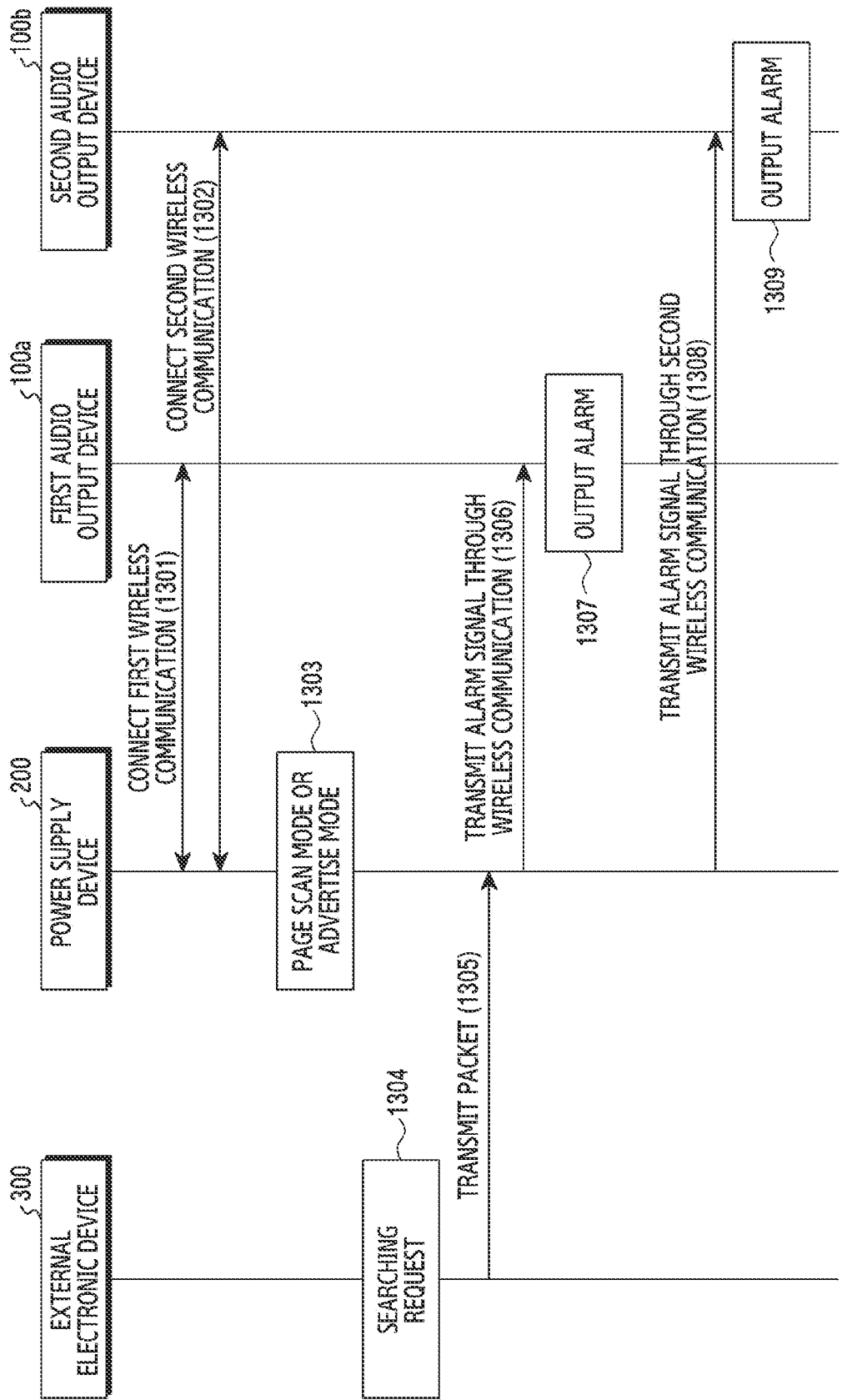
FIG. 13 illustrates a flowchart to explain a method for finding at least one audio output device in a communication connection state of FIG. 11C, based on a request of an external electronic device according to an embodiment.

FIG. 13 illustrates a flowchart to explain a method for finding at least one audio output device 100 in the communication connection state of FIG. 11C, based on a request of the external electronic device 300 according to an embodiment.

Referring to FIG. 13, in action 1301, the power supply device 200 may be in a state in which a first wireless communication is connected with the first audio output device 100*a*, and in action 1302, the power supply device 200 may be in a state in which a second wireless communication is connected with the second audio output device 100*b*. For example, the power supply device 200 may connect wireless communication with the first audio output device 100*a* and the second audio output device 100*b* by using the TWS+ method among the Bluetooth communication methods. The power supply device 200 according to an embodiment may know a first Bluetooth address of the first audio output device 100*a* in the process of establishing the first communication connection with the first audio output device 100*a*. In addition, the power supply device 200 according to an embodiment may know a second Bluetooth address of the second audio output device 100*b* in the process of establishing the second communication connection with the second audio output device 100*b*.

According to an embodiment, in action 1303, the power supply device 200 may operate in a page scan mode or operate in an advertise mode by using the first Bluetooth address and/or the second Bluetooth address. For example, the power supply device 200 may operate in the page scan mode or in the advertise mode by alternately using the first Bluetooth address and the second Bluetooth address with reference to a predetermined period.

According to an embodiment, while the power supply device 200 is operating in the page scan mode or in the advertise mode by using the first Bluetooth address and/or the second Bluetooth address, the external electronic device 300 may receive a searching request for the audio output device 100*a*, 100*b* (for example, a user input for finding the audio output device 100) in action 1304. For example, the external electronic device 300 may distinguish between a user input for finding the first audio output device 100*a* and a user input for finding the second audio output device 100*b*, and may receive the user input. In another example, the external electronic device 300 may receive a user input for finding both the first audio output device 100*a* and the second audio output device 100*b*.

According to an embodiment, in response to the searching request, in action 1305, the external electronic device 300 may transmit a communication packet including a signal for finding at least one of the first audio output device 100*a* and the second audio output device 100*b* to the power supply device 200. For example, the external electronic device 300 may connect Bluetooth communication with the power supply device 200, which operates in the scan mode by using the first Bluetooth address and/or the second Bluetooth address, and may transmit the packet including the signal for finding at least on of the first audio output device 100*a* and the second audio output device 100*b* to the power supply device 200. In another example, the external electronic device 300 may transmit the packet including the signal for finding at least one of the first audio output device 100*a* and the second audio output device 100*b* to the power supply device 200, which operates in the advertise mode, as a response signal.

According to an embodiment, when the power supply device 200 receives the communication packet including the signal for finding the first audio output device 100*a* from the external electronic device 300 in action 1305, the power supply device 200 may transmit, to the first audio output device 100*a*, a signal for letting the first audio output device 100*a* output an alarm, through the first wireless communication with the first audio output device 100*a* in action 1306. According to an embodiment, when the first audio output device 100*a* receives the signal for letting the first audio output device 100*a* output the alarm from the power supply device 200, the first audio output device 100*a* may reproduce audio data related to a sound effect or a sound guide in action 1307.

According to an embodiment, when the power supply device 200 receives the communication packet including the signal for finding the second audio output device 100*b* from the external electronic device 300 in action 1305, the power supply device 200 may transmit, to the second audio output device 100*b*, a signal for letting the second audio output device 100b output an alarm, through the second wireless communication with the second audio output device 100b in action 1308. According to an embodiment, when the second audio output device 100b receives the signal for letting the second audio output device 100b output the alarm from the power supply device 200, the second audio output device 100a may reproduce audio data related to a sound effect or a sound guide in action 1309.

According to an embodiment, when the power supply device 200 receives the communication packet including the signal for finding both the first audio output device 100a and the second audio output device 100b from the external electronic device 300 in action 1305, the power supply device 200 may transmit a signal for letting the first audio output device 1100a output an alarm to the first audio output device 100a through the first wireless communication in action 1306, and may transmit a signal for letting the second audio output device 100b output an alarm to the second audio output device 100b through the second wireless communication in action 1308. In this case, the first audio output device 100a and the second audio output device 100b may reproduce audio data related to the sound effect or the sound guide all together (or substantially at the same time) in actions 1307 and 1309, FIG. 14 a flowchart to explain a method for finding the power supply device 200 and/or the audio output device 100 by using a wireless communication address of the power supply device 200, based on a request of the external electronic device 300 according to an embodiment.

Figure 14:
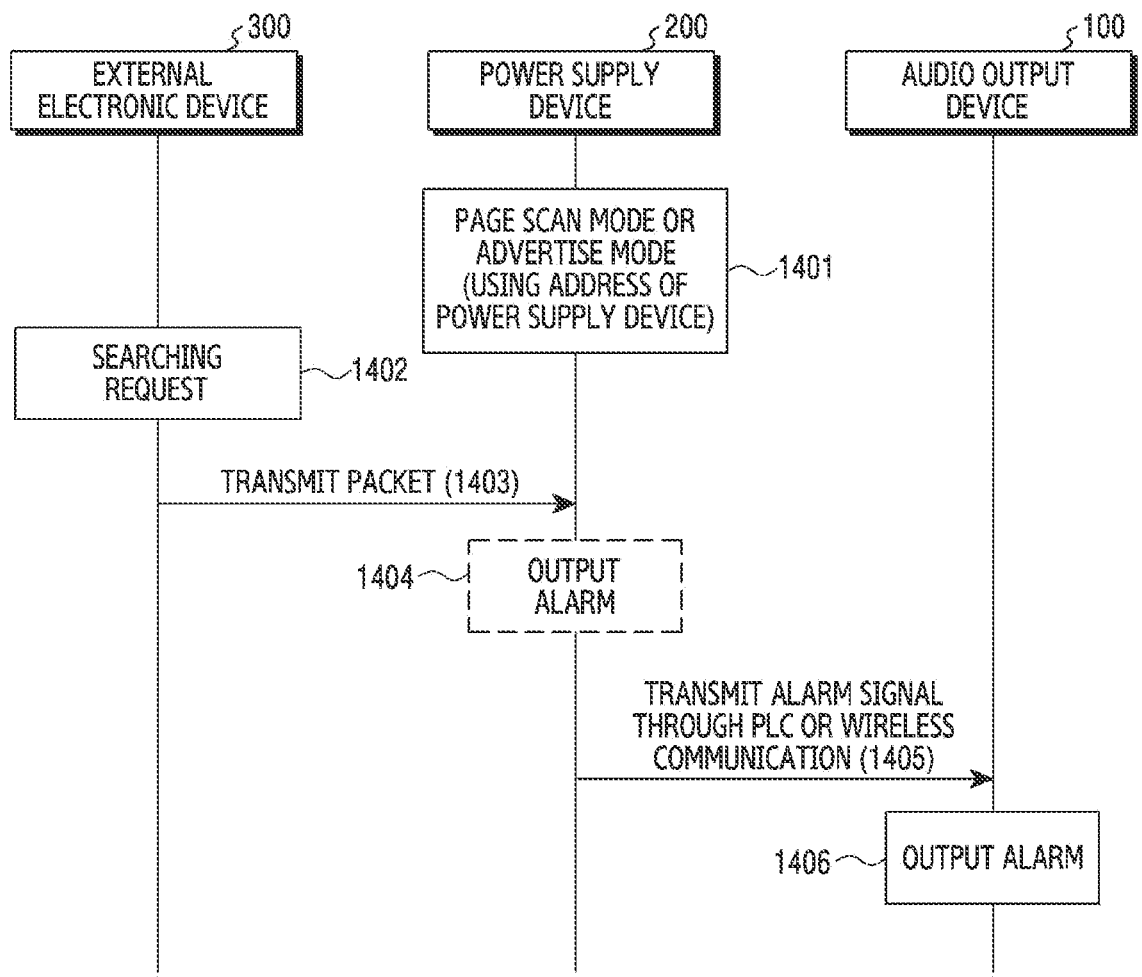
FIG. 14 illustrates a flowchart, to explain a method for finding a power supply device and/or an audio output device by using a wireless communication address of the power supply device, based on a request of an external electronic device according to an embodiment.

Referring to FIG. 14, in action 1401, the power supply device 200 may operate in a page scan mode or in an advertise mode by using a Bluetooth address of the power supply device 200. According to an embodiment, while the power supply device 200 is operating in the page scan mode or in the advertise mode by using the Bluetooth address of the power supply device 200, the external electronic device 300 may receive a searching request for the power supply device 200 and/or the audio output device 100 (that is, a user input for finding the power supply device 200 and/or the audio output device 100) in action 1402. According to an embodiment, in response to the searching request, the external electronic device 300 may transmit a communication packet including a signal for finding the power supply device 200 and/or the audio output device 100 to the power supply device 200 in action 1403. For example, the external electronic device 300 may connect Bluetooth communication with the power supply device 200 operating in the scan mode, and may transmit the packet including the signal for finding the power supply device 200 and/or the audio output device 100 to the power supply device 200. In another example, the external electronic device 300 may transmit the packet including the signal for finding the power supply device 200 and/or the audio output device 100 to the power supply device 200 operating in the advertise mode as a response signal.

According to an embodiment, in action 1403, the external electronic device 300 may know a wireless communication address of the power supply device 200. Accordingly, the external electronic device 300 may connect wireless communication with the power supply device 200 based on the wireless communication address of the power supply device 200, and may transmit the communication packet including the signal for finding the power supply device 200 and/or the audio output device 100 to the power supply device 200, or may transmit the communication packet including the signal for finding the power supply device 200 and/or the audio output device to the power supply device 200 in response to an advertising signal being received based on the wireless communication address of the power supply device 200.

According to an embodiment, in action 1403, the external electronic device 300 may contain, in the communication packet, not only the signal for finding the power supply device 200 and/or the audio output device 100 but also a signal for requesting a command for the audio output device 100 to output an alarm to be transmitted to the audio output device 100, and may transmit the communication packet to the power supply device 200.

According to an embodiment, since the power supply device 200 is connected with the external electronic device 300 by using its own wireless communication address, the external electronic device 300 may know information indicating that the audio output device 100 is received in the power supply device 200 in action 1403.

In action 1403, the power supply device 200 according to an embodiment may receive the communication packet including the signal for finding the power supply device 200 and/or the audio output device 100 from the external electronic device 300. For example, when the power supply device 200 receives the signal for finding the power supply device 200 from the external electronic device 300, the power supply device 200 may control an audio processing circuit to output an alarm in action 1404 if the power supply device 200 includes the audio processing circuit. In another example, when the power supply device 200 receives the signal for finding the audio output device 100 from the external electronic device 300, the power supply device 200 may transmit a signal for letting the audio output device 100 output an alarm to the audio output device 100 through the communication with the audio output device 100 in operation 1405 if there is communication (for example, PLC communication, Bluetooth communication) connected between the power supply device 200 and the audio output device 100.

In action 1406, the audio output device 100 according to an embodiment may reproduce audio data related to a sound effect or a sound guide in response to the alarm signal received from the power supply device 200.

According to an embodiment, a user may find the position of the power supply device 200 and/or the audio output device 100 by searching a position of the sound effect or the sound guide outputted.

Figure 15:
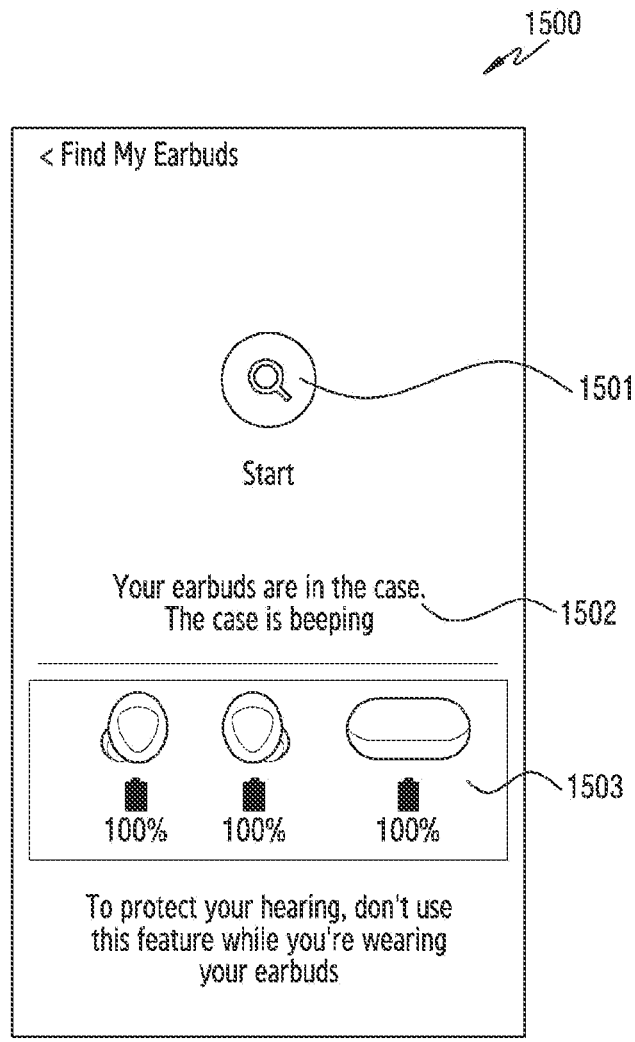
FIG. 15 illustrates a view of a user interface screen for finding an audio output device in an external electronic device according to an embodiment.

FIG. 15 illustrates a view of an example of a user interface screen 1500 for finding the audio output device 100 in the external electronic device 300 according to an embodiment.

Referring FIG. 15, the external electronic device 300 may find a position of the audio output device TOO by using the power supply device 200. According to an embodiment, the user interface screen 1500 of the external electronic device 300 for finding the audio output device 100 may include an icon 1501 for requesting searching of the audio output device 100, and may further include an area 1502 displaying information regarding a searching process (for example, searching, search completed, search error) of the audio output device 100, and an area 1503 displaying information regarding a state (for example, a battery state) of the power supply device 200 and the audio output device 100.

For example, a user may select the icon for finding the audio output device 100. The external electronic device 300 according to an embodiment may transmit a signal for finding the audio output device 100 to the power supply device 200 by using a Bluetooth address of the audio output device 100 in response to an input on the icon. According to an embodiment, the signal for finding the audio output device 100 may include a signal for requesting a command for the audio output device 100 to output an alarm to be transmitted to the audio output device 100.

According to an embodiment, when searching of the audio output device 100 is successfully completed through the power supply device 200 (that is, a signal for requesting an alarm is transmitted to the audio output device 100 through the power supply device 200), the power supply device 200 may transmit information regarding the searching process of the audio output device 100 to the external electronic device 300 by using Bluetooth communication with the external electronic device 300. Herein, the information regarding the searching process of the audio output device 100 may include, for example, information indicating that a sound effect or a sound guide is outputted, from the audio output device 100 and/or the power supply device 200, and information regarding whether the audio output device 100 is received in the power supply device 200. In this case, the power supply device 200 may also transmit information regarding the state of the audio output device 100 and the power supply device 200 (for example, a charging rate of the audio output device 100 and the power supply device 200) to the external electronic device 300.

The external electronic device 300 which receives the information regarding the searching process of the audio output device 100 may output the information indicating that the sound effect or the sound guide is outputted from the audio output device 100 (and/or the power supply device 200) (1502). The external electronic device 300 which receives the information regarding the state of the audio output device 100 and the power supply device 200 may also output information regarding the charging rate of the audio output device 100 and the power supply device 200 (1503).

Figure 16:
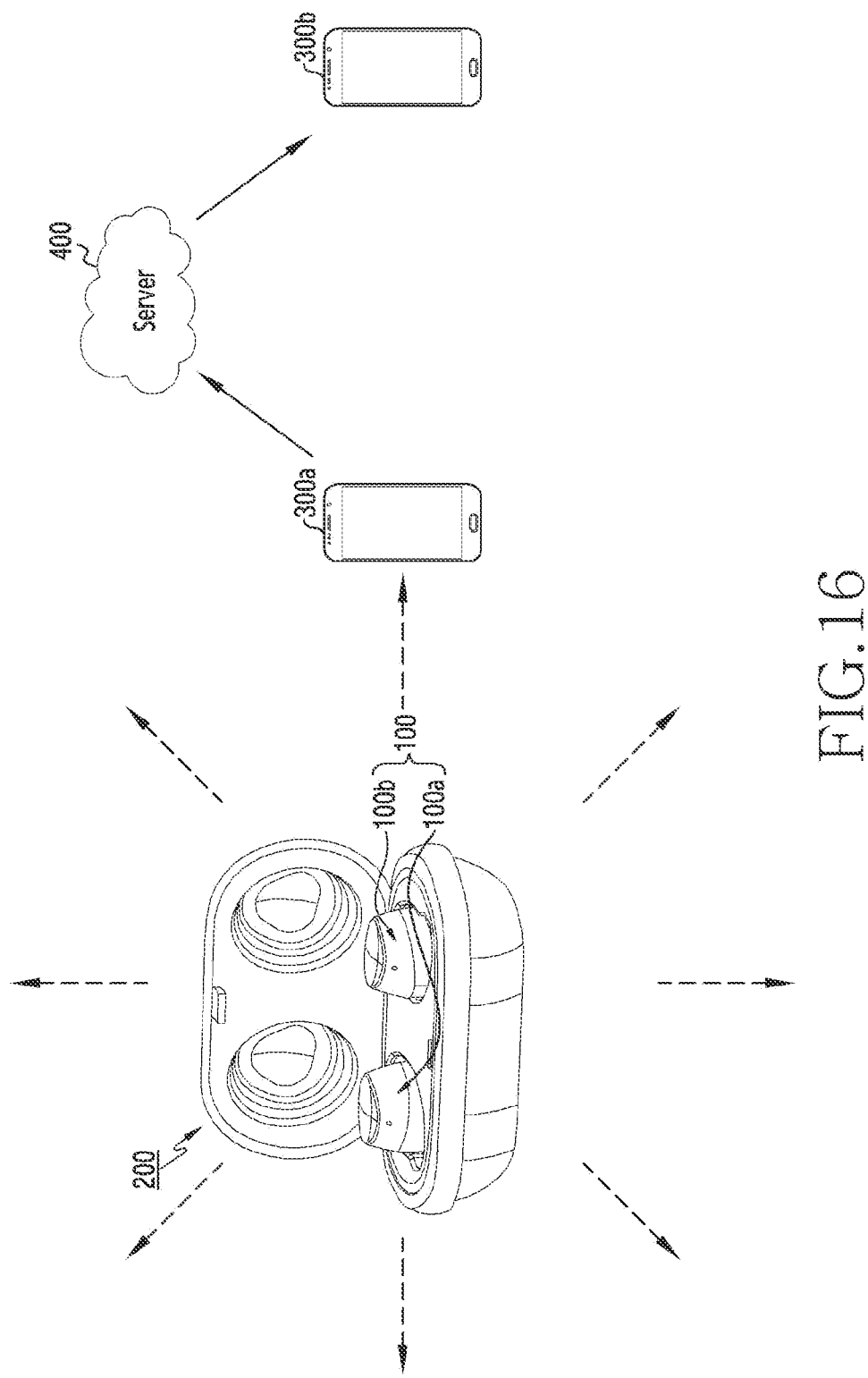
FIG. 16 illustrates a view of a method for finding an audio output device by using a peripheral electronic device and a server.

According to another embodiment, when searching of the audio output device 100 is not successfully completed (that is, the signal for requesting the alarm is not transmitted to the audio output device 100 through the power supply device 200), the external electronic device 300 may output information indicating that the external electronic device 300 fails to communicate with the audio output device 100 and/or the power supply device 200, FIG. 16 illustrates a view of a method for finding the audio output device 100 by using a peripheral electronic device 300a and a server 400.

Referring to FIG. 16, in a state where the audio output device 100 is received in the power supply device 200, the power supply device 200 may operate in an advertise mode by using a wireless communication address of the audio output device 100. When the power supply device 200 operates in the advertise mode by using the wireless communication address of the audio output device 100, the power supply device 200 may transmit an advertising signal to the peripheral electronic device 300a existing in the proximity of the power supply device 200. For example, in the advertise mode, the power supply device 200 may not exchange information with a specific electronic device with which communication is connected, but may transmit advertising signals to all electronic devices existing in the proximity of the power supply device 200. According to an embodiment, the power supply device 200 may operate in the advertise mode when the power supply device 200 does not receive a signal from the external electronic device 300b which is communicatively connected with the audio output device 100, within a designated time, by using a wireless communication address of the audio output device 100.

The peripheral electronic device 300a existing in the proximity of the power supply device 200 may receive the advertising signal transmitted by the power supply device 200. According to an embodiment, the peripheral electronic device 300a may not be the external electronic device 300b of a user account but an unspecific peripheral electronic device 300a existing in the proximity of the power supply device 200. According to an embodiment, the peripheral electronic device 300a which receives the advertising signal from the power supply device 200 may upload information regarding a corresponding position where the advertising signal is received on the server 400.

According to an embodiment, when the external electronic device 300b of the user account receives an input for finding the audio output device 100 from a user, the external electronic device 300b may use the information regarding the position where the peripheral electronic device 300a receives the advertising signal, which is uploaded on the server 400. The external electronic device 300b may output estimated position information of the power supply device 200 and the audio output device 100 by using the information uploaded on the server 400. According to an embodiment, when the power supply device 200 receives a designated signal from the external electronic device 300b by using the wireless communication address of the audio output device 100, the power supply device 200 may transmit a command to output an alarm (for example, a sound effect, a sound guide, and/or a vibration) to the audio output device 100 through PLC. For example, the designated signal that the power supply device 200 receives from the external electronic device 300b may include a signal for requesting the command for the audio output device 100 to output the alarm to be transmitted to the audio output device 100.

Figure 17:
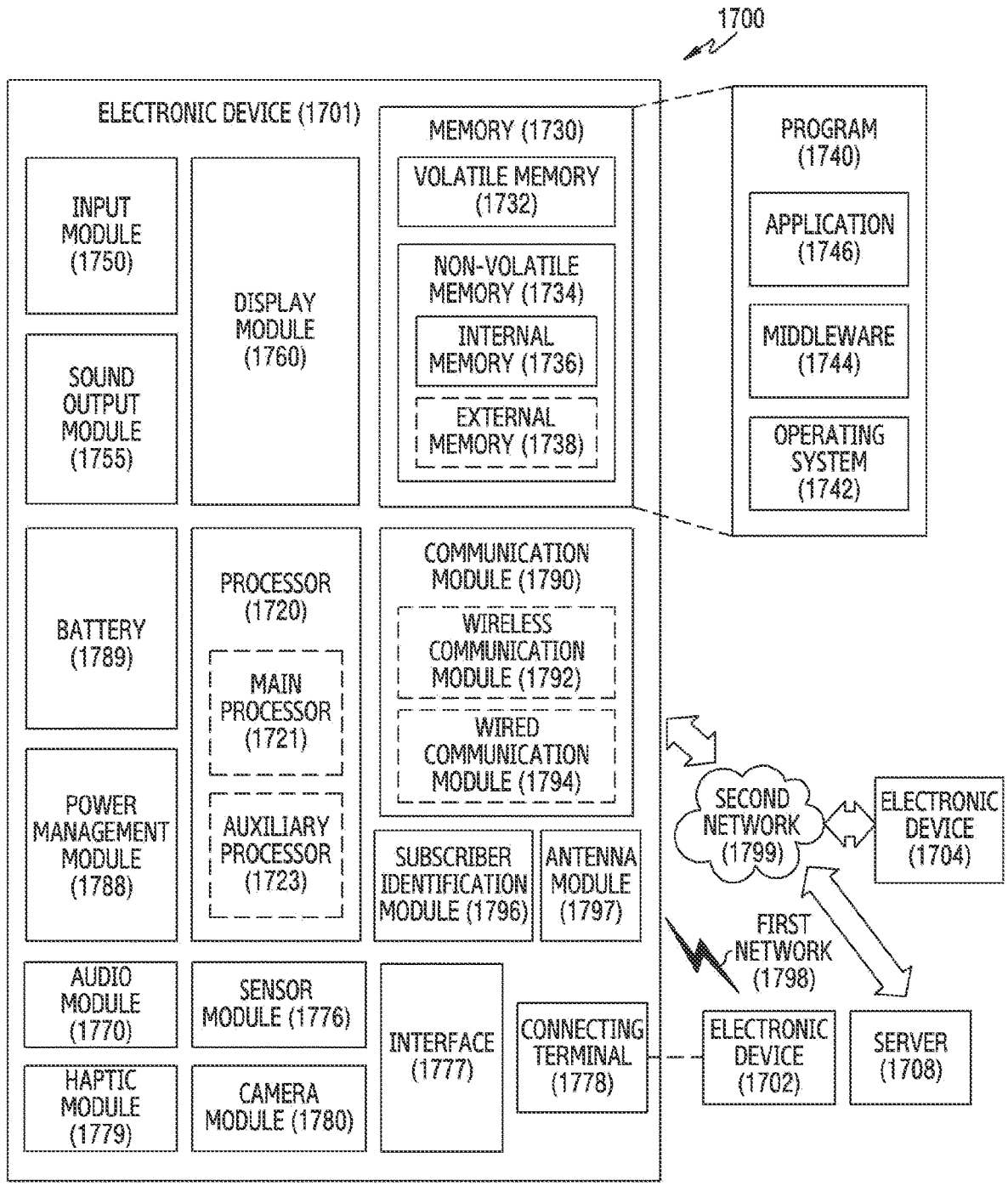
FIG. 17 illustrates a block diagram of an external electronic device in a network environment according to various embodiments.

FIG. 17 illustrates a block diagram of an electronic device 1701 in a network environment 1700 according to various embodiments.

Referring to FIG. 17, the electronic device 1701 in the network environment 1700 may communicate with an electronic device 1702 via a first network 1798 (e.g., a short-range wireless communication network), or at least one of an electronic device 1704 or a server 1708 via a second network 1799 (e.g., a long-range wireless communication network). According to an embodiment, the electronic device 1701 may communicate with the electronic device 1704 via the server 1708. According to an embodiment, the electronic device 1701 may include a processor 1720, a memory 1730, an input module 1750, a sound output module 1755, a display module 1760, an audio module 1770, a sensor module 1776, an interface 1777, a connecting terminal 1778, a haptic module 1779, a camera module 1780, a power management module 1788, a battery 1789, a communication module 1790, a subscriber identification module (SIM) 1796, or an antenna module 1797. In some embodiments, at least one of the components (e.g., the connecting terminal 1778) may be omitted from the electronic device 1701, or one or more other components may be added in the electronic device 1701. In some embodiments, some of the components (e.g., the sensor module 1776, the camera module 1780, or the antenna module 1797) may be implemented as a single component (e.g., the display module 1760).

The processor 1720 may execute, for example, software (e.g., a program 1740) to control at least one other component (e.g., a hardware or software component) of the electronic device 1701 coupled with the processor 1720, and may perform various data processing or computation. According to one embodiment, as at least part of the data processing or computation, the processor 1720 may store a command or data received from another component (e.g., the sensor module 1776 or the communication module 1790)

in the volatile memory 1732, process the command or the data stored in the volatile memory 1732, and store resulting data in the non-volatile memory 1734 According to an embodiment, the processor 1720 may include a main processor 1721 (e.g., a central processing unit (CPU) or an application processor (AP)), or an auxiliary processor 1723 (e.g., a graphics processing unit (GPU), a neural processing unit (NPU), an image signal processor (ISP), a sensor hub processor, or a communication processor (CP)) that is operable independently from, or in conjunction with, the main processor 1721. For example, when the electronic device 1701 includes the main processor 1721 and the auxiliary processor 1723, the auxiliary processor 1723 may be adapted to consume less power than the main processor 1721, or to be specific to a specified function. The auxiliary processor 1723 may be implemented as separate from, or as part of the main processor 1721.

The auxiliary processor 1723 may control at least some of functions or states related to at least one component (e.g., the display module 1760, the sensor module 1776, or the communication module 1790) among the components of the electronic device 1701, instead of the main processor 1721 while the main processor 1721 is in an inactive (e.g., sleep) state, or together with the main processor 1721 while the main processor 1721 is in an active state (e.g., executing an application). According to an embodiment, the auxiliary processor 1723 (e.g., an image signal processor or a communication processor) may be implemented as part of another component (e.g., the camera module 1780 or the communication module 1790) functionally related to the auxiliary processor 1723. According to an embodiment, the auxiliary processor 1723 (e.g., the neural processing unit) may include a hardware structure specified for artificial intelligence model processing. An artificial intelligence model may be generated by machine learning. Such learning may be performed, e.g., by the electronic device 1701 where the artificial intelligence is performed or via a separate server (e.g., the server 1708). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network or a combination of two or more thereof but is not limited thereto. The artificial intelligence model may, additionally or alternatively, include a software structure other than the hardware structure.

The memory 1730 may store various data used by at least one component (e.g., the processor 1720 or the sensor module 1776) of the electronic device 1701. The various data may include, for example, software (e.g., the program 1740) and input data or output data for a command related thereto. The memory 1730 may include the volatile memory 1732 or the non-volatile memory 1734.

The program 1740 may be stored in the memory 1730 as software, and may include, for example, an operating system (OS) 1742, middleware 1744, or an application 1746.

The input module 1750 may receive a command or data to be used by another component (e.g., the processor 1720) of the electronic device 1701, from the outside (e.g., a user) of the electronic device 1701. The input module 1750 may include, for example, a microphone, a mouse, a keyboard, a key (e.g., a button), or a digital pen (e.g., a stylus pen).

The sound output module 1755 may output sound signals to the outside of the electronic device 1701. The sound output module 1755 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1760 may visually provide information to the outside (e.g., a user) of the electronic device 1701. The display module 1760 may include, for example, a display, a hologram device, or a projector and control circuitry to control a corresponding one of the display, hologram device, and projector. According to an embodiment, the display module 1760 may include a touch sensor adapted to detect a touch, or a pressure sensor adapted to measure the intensity of force incurred by the touch.

The audio module 1770 may convert a sound into an electrical signal and vice versa. According to an embodiment, the audio module 1770 may obtain the sound via the input module 1750, or output the sound via the sound output module 1755 or a headphone of an external electronic device (e.g., an electronic device 1702) directly (e.g., wired) or wirelessly coupled with the electronic device 1701.

The sensor module 1776 may detect an operational state (e.g., power or temperature) of the electronic device 1701 or an environmental state (e.g., a state of a user) external to the electronic device 1701, and then generate an electrical signal or data value corresponding to the detected state. According to an embodiment, the sensor module 1776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1777 may support one or more specified protocols to be used for the electronic device 1701 to be coupled with the external electronic device (e.g., the electronic device 1702) directly (e.g., wired) or wirelessly. According to an embodiment, the interface 1777 may include, for example, a high definition multimedia interface (HDMI), a universal serial bus (USB) interface, a secure digital (SD) card interface, or an audio interface.

A connecting terminal 1778 may include a connector via which the electronic device 1701 may be physically connected with the external electronic device (e.g., the electronic device 1702). According to an embodiment, the connecting terminal 1778 may include, for example, a HDMI connector, a USB connector, a SD card connector, or an audio connector (e.g., a headphone connector).

The haptic module 1779 may convert an electrical signal into a mechanical stimulus (e.g., a vibration or a movement) or electrical stimulus which may be recognized by a user via his tactile sensation or kinesthetic sensation. According to an embodiment, the haptic module 1779 may include, for example, a motor, a piezoelectric element, or an electric stimulator.

The camera module 1780 may capture a still image or moving images. According to an embodiment, the camera module 1780 may include one or more lenses, image sensors, image signal processors, or flashes.

The power management module 1788 may manage power supplied to the electronic device 1701. According to one embodiment, the power management module 1788 may be implemented as at least part of, for example, a power management integrated circuit (PMIC).

The battery 1789 may supply power to at least one component of the electronic device 1701. According to an embodiment, the battery 1789 may include, for example, a primary cell which is not rechargeable, a secondary cell which is rechargeable, or a fuel cell.

The communication module 1790 may support establishing a direct (e.g., wired) communication channel or a wireless communication channel between the electronic device 1701 and the external electronic device (e.g., the electronic device 1702, the electronic device 1704, or the server 1708) and performing communication via the established communication channel. The communication module 1790 may include one or more communication processors that are operable independently from the processor 1720 (e.g., the application processor (AP)) and supports a direct (e.g., wired) communication or a wireless communication. According to an embodiment, the communication module 1790 may include a wireless communication module 1792 (e.g., a cellular communication module, a short-range wireless communication module, or a global navigation satellite system (GNSS) communication module) or a wired communication module 1794 (e.g., a local area network (LAN) communication module or a power line communication (PLC) module). A corresponding one of these communication modules may communicate with the external electronic device via the first network 1798 (e.g., a short-range communication network, such as Bluetooth™, wireless-fidelity (Wi-Fi) direct, or infrared data association (IrDA)) or the second network 1799 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1792 may identify and authenticate the electronic device 1701 in a communication network, such as the first network 1798 or the second network 1799, using subscriber information (e.g., international mobile subscriber identity stored in the subscriber identification module 1796.

The wireless communication module 1792 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1792 may support a high-frequency band (e.g., the mmWave band) to achieve, e.g., a high data transmission rate. The wireless communication module 1792 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1792 may support various requirements specified in the electronic device 1701, an external electronic device (e.g., the electronic device 1704), or a network system (e.g., the second network 1799). According to an embodiment, the wireless communication module 1792 may support a peak data rate (e.g., 20 Gbps or more) for implementing eMBB, loss coverage (e.g., 1.64 dB or less) for implementing mMTC, or U-plane latency (e.g., 0.5 ms or less for each of downlink (DL) and uplink (UL), or a round trip of 1 ms or less) for implementing URLLC.

The antenna module 1797 may transmit or receive a signal or power to or from the outside (e.g., the external electronic device) of the electronic device 1701. According to an embodiment, the antenna module 1797 may include an antenna including a radiating element composed of a conductive material or a conductive pattern formed in or on a substrate (e.g., a printed circuit board (PCB)). According to an embodiment, the antenna module 1797 may include a plurality of antennas (e.g., array antennas). In such a case, at least one antenna appropriate for a communication scheme used in the communication network, such as the first network 1798 or the second network 1799, may be selected, for example, by the communication module 1790 (e.g., the wireless communication module 1792) from the plurality of antennas. The signal or the power may then be transmitted or received between the communication module 1790 and the external electronic device via the selected at least one antenna. According to an embodiment, another component (a radio frequency integrated circuit (RFIC)) other than the radiating element may be additionally formed as part of the antenna module 1797.

According to various embodiments, the antenna module 1797 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPM), serial peripheral interface (SPI), or mobile industry processor interface (MIPI)).

According to an embodiment, commands or data may be transmitted or received between the electronic device 1701 and the external electronic device 1704 via the server 1708 coupled with the second network 1799. Each of the electronic devices 1702 or 1704 may be a device of a same type as, or a different type, from the electronic device 1701. According to an embodiment, all or some of operations to be executed at the electronic device 1701 may be executed at one or more of the external electronic devices 1702, 1704, or 1708. For example, if the electronic device 1701 should perform a function or a service automatically, or in response to a request from a user or another device, the electronic device 1701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1701. The electronic device 1701 may provide the outcome, with or without further processing of the outcome, as at least part of a reply to the request. To that end, a cloud computing, distributed computing, mobile edge computing (MEC), or client-server computing technology may be used, for example. The electronic device 1701 may provide ultra low-latency services using, e.g., distributed computing or mobile edge computing. In another embodiment, the external electronic device 1704 may include an internet-of-things (IoT) device. The server 1708 may be an intelligent server using machine learning and/or a neural network. According to an embodiment, the external electronic device 1704 or the server 1708 may be included in the second network 1799. The electronic device 1701 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1740) including one or more instructions that are stored in a storage medium (e.g., internal memory 1736 or external memory 1738) that is readable by a machine (e.g., the electronic device 1701). For example, a processor (e.g., the processor 1720) of the machine (e.g., the electronic device 1701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart art phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

As described above, an electronic device (for example, the power supply device 200 of FIG. 1, the power supply device 200 of FIG. 4) according to an embodiment may include: a wireless communication circuit 410; a power management circuit 430; and a control circuit 450 electrically connected with the wireless communication circuit 410 and the power management circuit 430, and the control circuit 450 may be configured to: in a state where the electronic device connects a first communication with a first audio output device by using the wireless communication circuit 410, or is electrically connected with the first audio output device by using the power management circuit 430, operate in a connection standby mode or in an advertise mode by using a first wireless communication address of the first audio output device; receive a signal for finding the first audio output device from an external electronic device, based on the first wireless communication address; and, in response to the signal for finding the first audio output device being received, transmit a signal for letting the first audio output device output a notification (or an alarm) to the first audio output device through the first communication, or to transmit the signal to the first audio output device through the electrical connection.

According to an embodiment, the control circuit 410 may perform a page scan action in the connection standby mode through the wireless communication circuit 410, and may perform an action of transmitting an advertising signal to a peripheral electronic device including the external electronic device in the advertise mode.

According to an embodiment, when operating in the connection standby mode by using the first wireless communication address, the control circuit 450 may receive a wireless communication connection request based on the first wireless communication address from the external electronic device, may connect second communication with the external electronic device in response to the wireless communication connection request being received, and may receive a packet including the signal for finding the first audio output device from the external electronic device through the second communication.

According to an embodiment, when operating in the advertise mode by using the first wireless communication address, the control circuit 450 may transmit an advertising signal based on the first wireless communication address to a peripheral electronic device including the external electronic device, and may receive a packet including the signal for finding the first audio output device from the external electronic device which receives the advertising signal.

According to an embodiment, the control circuit 450 may PLC with the first audio output device when being electrically connected with the first audio output device.

According to an embodiment, the control circuit 450 may receive information regarding the first wireless communication address of the first audio output device through the PLC when being electrically connected with the first audio output device.

According to an embodiment, the control circuit 450 may further receive a signal for finding a second audio output device from the external electronic device, based on the first wireless communication address, and, in response to the signal for finding the second audio output device being received, may transmit a signal for letting the second audio output device output a notification to the first audio output device through the first communication.

According to an embodiment, in response to the signal for finding the first audio output device being received, the control circuit 450 may further transmit a signal for enabling the first audio output device to the first audio output device through the electrical connection when the first audio output device is disabled.

As described above, a method for finding a position of an audio output device (for example, the audio output device 100 of FIG. 1, the audio output device 100 of FIG. 3) by using an electronic device (for example the power supply device 200 of FIG. 1, the power supply device 200 of FIG. 4) according to an embodiment may include: in a state where the electronic device connects a first communication with a first audio output device or is electrically connected with the first audio output device, operating in a connection standby mode or in an advertise mode by using a first wireless communication address of the first audio output device; receiving a signal for finding the first audio output device from an external electronic device, based on the first wireless communication address; and, in response to the signal for finding the first audio output device being received, transmitting a signal for letting the first audio output device output a notification (or an alarm) to the first audio output device through the first communication, or transmitting the signal to the first audio output device through the electrical connection.

According to an embodiment, operating in the connection standby mode may include operating in a page scan mode, and operating in the advertise mode may include transmitting an advertising signal to a peripheral electronic device including the external electronic device.

According to an embodiment, operating in the connection standby mode by using the first wireless communication address of the first audio output device may include: receiving a wireless communication connection request based on the first wireless communication address from the external electronic device; connecting a second communication with the external electronic device in response to the wireless communication connection request being received; and receiving a packet including the signal for finding the first audio output device from the external electronic device through the second communication.

According to an embodiment, operating in the advertise mode by using the first wireless communication address of the first audio output device may include: transmitting an advertising signal based on the first wireless communication address to a peripheral electronic device including the external electronic device; and receiving a packet including the signal for finding the first audio output device from the external electronic device which receives the advertising signal.

According to an embodiment, the electronic device may perform PLC with the first audio output device when being electrically connected with the first audio output device.

According to an embodiment, the method may further include receiving information regarding the first wireless communication address of the first audio output device through the PLC when the electronic device is electrically connected with the first audio output device.

According to an embodiment, the method may further include: receiving a signal for finding a second audio output device from the external electronic device, based on the first wireless communication address; and, in response to the signal for finding the second audio output device being received, transmitting a signal for letting the second audio output device output a notification to the first audio output device through the first communication.

According to an embodiment, transmitting the signal for letting the first audio output device output the notification to the first audio output device through the electrical connection may include transmitting a signal for enabling the first audio output device to the first audio output device through the electrical connection when the first audio output device is disabled.

As described above, an audio output device (for example, the audio output device 100 of FIG. 1, the audio output device 100 of FIG. 3) according to an embodiment may include: an audio processing circuit 340; a power management circuit 360: a wireless communication circuit 310 configured to establish communication connection by using a wireless communication address; and a control circuit 380 electrically connected with the audio processing circuit 340, the power management circuit 360, and the wireless communication circuit 310, and the control circuit 380 may establish a first communication connection with a power supply device by using the wireless communication circuit 310, or electrical connection with the power supply device by using the power management circuit 360, may receive, from the power supply device, a signal for finding at least one audio output device including the audio output device, the signal being received by the power supply device from an external electronic device, and in response to the signal for finding the at least one audio output device being received, may control the audio processing circuit 340 to output a notification (or an alarm).

According to an embodiment, in a state where wireless communication existing between the audio output device and the external electronic device is disconnected, the control circuit 380 may establish the first communication connection with the power supply device or the electrical connection with the power supply device, and, when the electrical connection with the power supply device is established, may transmit information regarding the wireless communication address to the power supply device through the electrical connection.

According to an embodiment, in response to the signal for finding the at least one audio output device being received, the control circuit 380 may transmit a signal for letting another audio output device output a notification to the another audio output device.

According to an embodiment, the signal for finding the at least one audio output device may be a signal that is received from an external electronic device through communication with the external electronic device that is established by the power supply device by using a Bluetooth address of the audio output device.

Although the present disclosure has been described with various embodiments, various changes and modifications may be suggested to one skilled in the art. It is intended that the present disclosure encompass such changes and modifications as fall within the scope of the appended claims.

What is claimed:
1. An electronic device comprising:
a wireless communication circuit;
a power management circuit; and
a control circuit electrically connected with the wireless communication circuit and the power management circuit,
wherein the control circuit is configured to:
in a state where the electronic device connects a first communication with a first audio output device by using the wireless communication circuit, or is electrically connected with the first audio output device by using the power management circuit, operate in a connection standby mode or in an advertise mode by using a first wireless communication address of the first audio output device;
receive a signal for finding the first audio output device from an external electronic device, based on the first wireless communication address; and
in response to the signal for finding the first audio output device being received:
transmit a signal for letting the first audio output device output a notification to the first audio output device through the first communication, or transmit the signal to the first audio output device through the electrical connection.
2. The electronic device of claim 1, wherein the control circuit is further configured to, through the wireless communication circuit:
perform a page scan action in the connection standby mode; and
perform an action of transmitting an advertising signal to a peripheral electronic device comprising the external electronic device in the advertise mode.
3. The electronic device of claim 1, wherein the control circuit is further configured to, when operating in the connection standby mode by using the first wireless communication address:
receive, from the external electronic device, a wireless communication connection request based on the first wireless communication address;
connect a second communication with the external electronic device in response to the wireless communication connection request being received; and
receive, from the external electronic device through the second communication, a packet comprising the signal for finding the first audio output device.
4. The electronic device of claim 1, wherein the control circuit is further configured to, when operating in the advertise mode by using the first wireless communication address:
transmit an advertising signal based on the first wireless communication address to a peripheral electronic device comprising the external electronic device; and
receive, from the external electronic device which receives the advertising signal, a packet comprising the signal for finding the first audio output device.
5. The electronic device of claim 1, wherein the control circuit is further configured to perform power line communication (PLC) with the first audio output device when being electrically connected with the first audio output device.
6. The electronic device of claim 5, wherein the control circuit is further configured to receive information regarding the first wireless communication address of the first audio output device through the PLC when being electrically connected with the first audio output device.
7. The electronic device of claim 1, wherein the control circuit is further configured to:
receive a signal for finding a second audio output device from the external electronic device, based on the first wireless communication address; and
in response to the signal for finding the second audio output device being received, transmit, through the first communication, a signal for letting the second audio output device output a notification to the first audio output device.
8. The electronic device of claim 1, wherein the control circuit is further configured to, in response to the signal for finding the first audio output device being received, further transmit a signal for enabling the first audio output device to the first audio output device through the electrical connection when the first audio output device is disabled.
9. An audio output device comprising:
an audio processing circuit;
a power management circuit;
a wireless communication circuit configured to establish a communication connection by using a wireless communication address; and
a control circuit electrically connected with the audio processing circuit, the power management circuit, and the wireless communication circuit,
wherein the control circuit is configured to:
establish a first communication connection with a power supply device by using the wireless communication circuit, or an electrical connection with the power supply device by using the power management circuit;
receive, from the power supply device, a signal for finding at least one audio output device comprising the audio output device, the signal being received by the power supply device from an external electronic device; and
in response to the signal for finding the at least one audio output device being received, control the audio processing circuit to output a notification.

10. The audio output device of claim 9, wherein the control circuit is configured to:
- in a state where wireless communication existing between the audio output device and the external electronic device is disconnected, establish the first communication connection with the power supply device or the electrical connection with the power supply device; and
- when the electrical connection with the power supply device is established, transmit information regarding the wireless communication address to the power supply device through the electrical connection.

11. The audio output device of claim 9, wherein the control circuit is configured to, in response to the signal for finding the at least one audio output device being received, transmit a signal for letting another audio output device output a notification to the another audio output device.

12. The audio output device of claim 9, wherein the signal for finding the at least one audio output device is a signal that is received from an external electronic device through communication with the external electronic device that is established by the power supply device by using a Bluetooth address of the audio output device.

\* \* \* \* \*

UNITED STATES PATENT AND TRADEMARK OFFICE
CERTIFICATE OF CORRECTION

Page 1 of 1

PATENT NO. : 12,207,065 B2
APPLICATION NO. : 18/045767
DATED : January 21, 2025
INVENTOR(S) : Juyeon Jin et al.

It is certified that error appears in the above-identified patent and that said Letters Patent is hereby corrected as shown below:

On the Title Page

Column 1, after Item (63), but before Item (51), insert new Item (30) to read:
--(30) Foreign Application Priority Data
Dec. 29, 2020 (KR) ................... 10-2020-0186522--

Signed and Sealed this
Eighteenth Day of February, 2025

Coke Morgan Stewart
*Acting Director of the United States Patent and Trademark Office*